United States Patent
Zatocil et al.

(10) Patent No.: US 11,552,585 B2
(45) Date of Patent: Jan. 10, 2023

(54) METHOD TO OPERATE A THREE-PHASE CAGE MOTOR

(71) Applicant: Siemens Aktiengesellschaft, Munich (DE)

(72) Inventors: Heiko Zatocil, Nuremberg (DE); Hauke Nannen, Nuremberg (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/519,860

(22) Filed: Nov. 5, 2021

(65) Prior Publication Data
US 2022/0158576 A1    May 19, 2022

(30) Foreign Application Priority Data

Nov. 17, 2020 (EP) .................................. 20208065

(51) Int. Cl.
*H02P 21/09* (2016.01)
*H02P 21/22* (2016.01)
*H02P 21/34* (2016.01)

(52) U.S. Cl.
CPC .......... *H02P 21/09* (2016.02); *H02P 21/22* (2016.02); *H02P 21/34* (2016.02); *H02P 2207/01* (2013.01); *H02P 2207/05* (2013.01)

(58) Field of Classification Search
USPC ........................................ 318/430, 445, 453
See application file for complete search history.

(56) References Cited

U.S. PATENT DOCUMENTS

| | | | |
|---|---|---|---|
| 2009/0058341 A1* | 3/2009 | Lu ................ | H02P 23/0004 318/504 |
| 2015/0219055 A1* | 8/2015 | Desabhatla ....... | H02P 9/08 290/31 |
| 2015/0263526 A1* | 9/2015 | Kjær .............. | H02J 3/381 290/44 |
| 2020/0076333 A1* | 3/2020 | McElveen, Jr. ...... | H02P 1/028 |

FOREIGN PATENT DOCUMENTS

| | | | | |
|---|---|---|---|---|
| EP | 0379608 A1 | 8/1990 | | |
| EP | 2499736 A1 | 9/2012 | | |
| EP | 2499736 B1 * | 1/2014 | ...... | H02P 1/28 |
| EP | 3557760 A1 | 10/2019 | | |
| EP | 3629468 A1 | 4/2020 | | |
| EP | 3 916 998 A1 | 12/2021 | | |
| WO | WO 0148908 A1 | 7/2001 | | |

OTHER PUBLICATIONS

Nannen, Hauke; Zatocil, Heiko; Griepentrog, Gerd: Novel predictive start-up algorithm for soft starter driven induction motors, IECON 2020, 46th Annual Conference of the IEEE Industrial Electronics Society (IES), Oct. 18-21, 2020, Singapore; 2020.

\* cited by examiner

*Primary Examiner* — Jorge L Carrasquillo
(74) *Attorney, Agent, or Firm* — Harness, Dickey & Pierce, P.L.C.

(57) ABSTRACT

A method is for operating a three-phase cage motor on a multiphase electrical grid via a soft starter, with which one or more grid phases of the grid being respectively switchable by firing thyristors. Apart from a grid-related firing criterion, a rotor-flux-related firing criterion is taken into account.

20 Claims, 20 Drawing Sheets

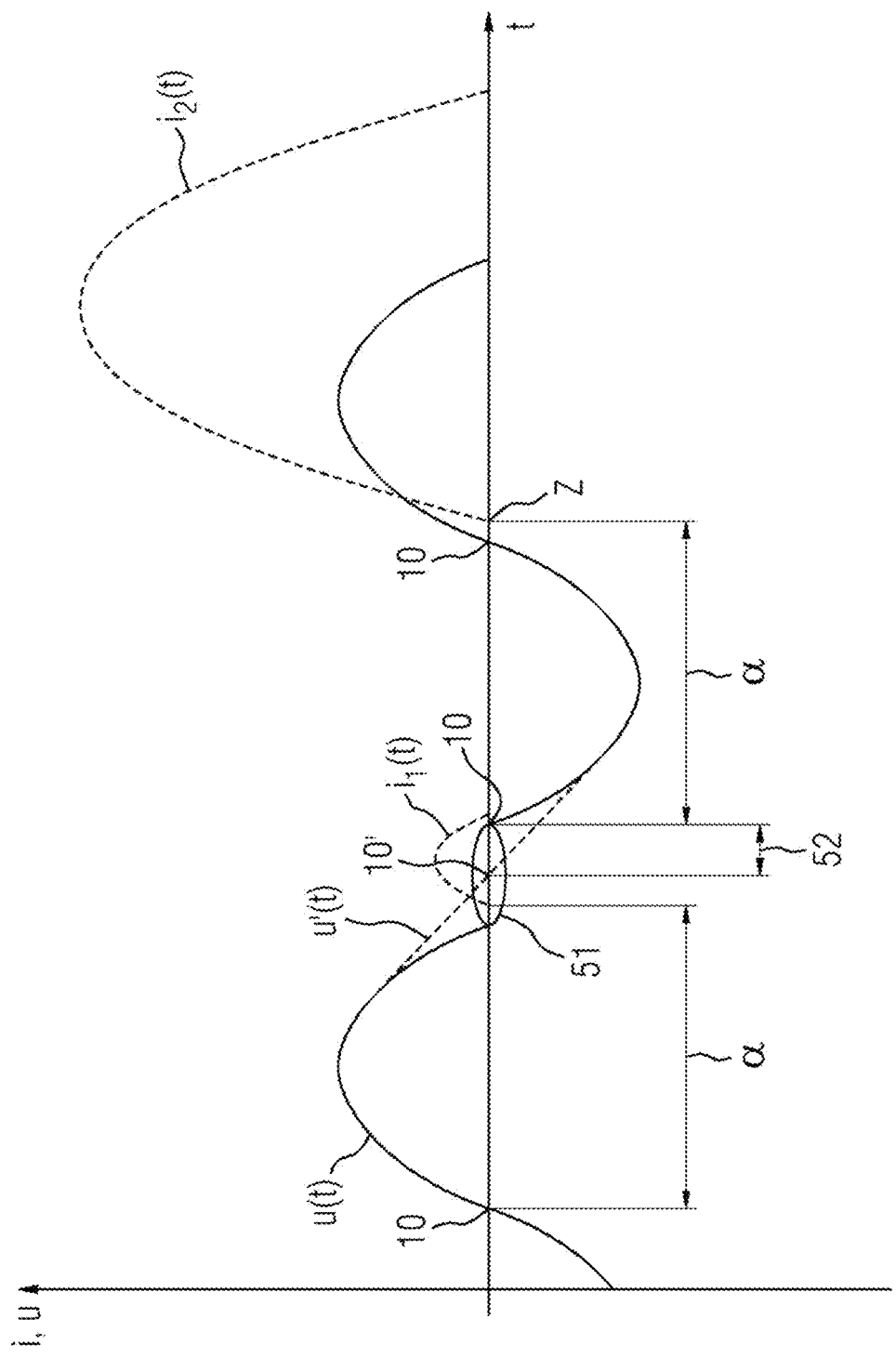

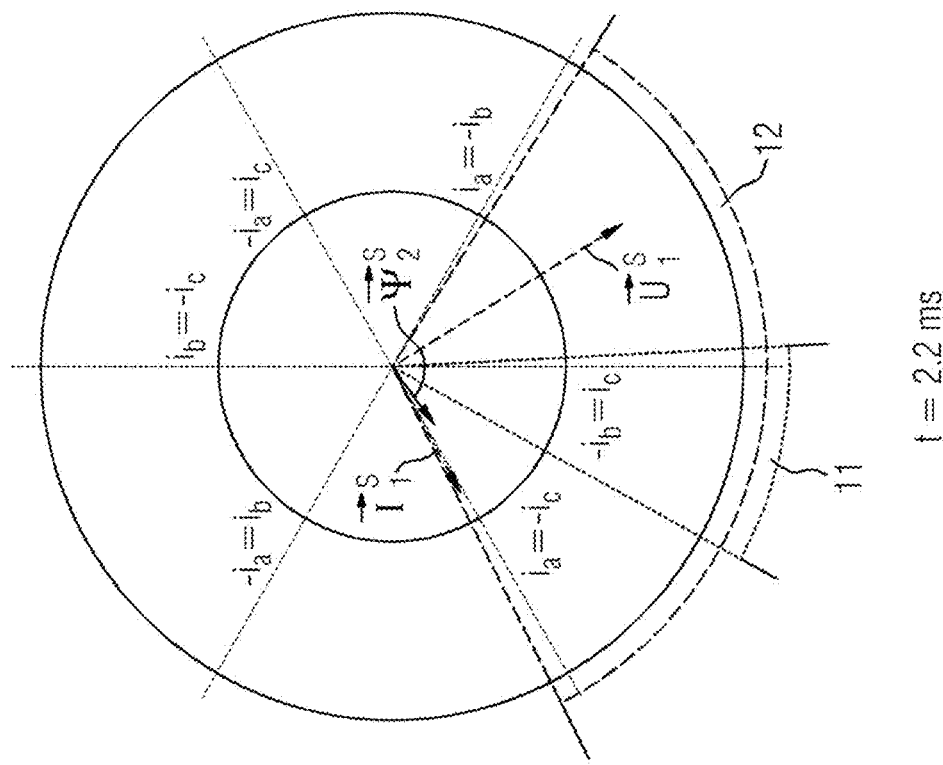
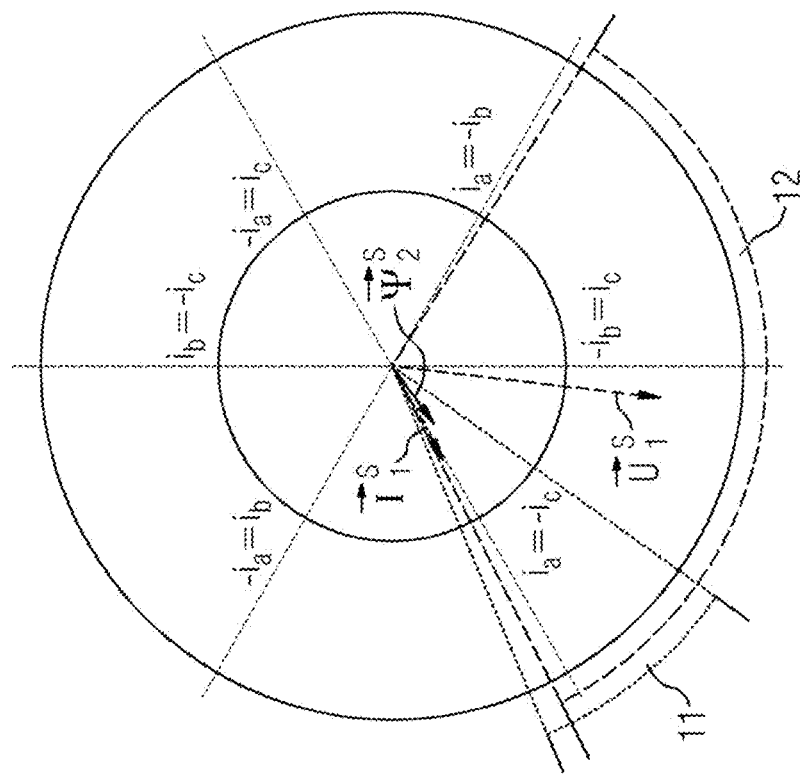

METHOD TO OPERATE A THREE-PHASE CAGE MOTOR

PRIORITY STATEMENT

The present application hereby claims priority under 35 U.S.C. § 119 to European patent application number EP 20208065.1 filed Nov. 17, 2020, the entire contents of which are hereby incorporated herein by reference.

FIELD

Example embodiments of the invention generally relate to a method for operating a three-phase cage motor. Similarly, example embodiments of the invention relates to a soft starter. Equally, example embodiments of the invention relates to a computer program product with which the method can be carried out.

BACKGROUND

In the European patent application EP20176295.2 with the filing date May 25, 2020, which comes under Article 54 (3) EPC, and in the conference paper Nannen, Hauke; Zatocil, Heiko; Griepentrog, Gerd: Novel predictive start-up algorithm for soft starter driven induction motors, IECON 2020, 46th Annual Conference of the IEEE Industrial Electronics Society (IES), Oct. 18-21, 2020, Singapore, which is referred to hereinafter as "Nannen et al.", a description is given of a model-predictive control method for asynchronous machines on the soft starter, with which motor and thyristor losses can be lowered. On the basis of measured and/or calculated state variables such as the grid voltage, grid frequency, rotor speed and rotor flux, a prediction of current and torque profiles is made for all possible thyristor firing combinations by way of a real-time simulation. These profiles are assessed on the basis of decision criteria in order to identify usable firing possibilities. One disadvantage of this method is that predicting the behavior of the motor in real time requires high computational power; this leads to significant extra costs for the processor or microcontroller.

SUMMARY

At least one embodiment of the present invention defines a method which on the one hand offers a similar operating method to the model-predictive approach, but on the other hand does not require such high computational power.

At least one embodiment is directed to a method. It is a method which serves for operating a three-phase cage motor on a multiphase electrical grid. Operation takes place with the aid of a soft starter, with which one or more grid phases of the grid can respectively be switched by firing thyristors. Apart from at least one grid-related firing criterion, the operating method additionally takes into account at least one rotor-flux-related firing criterion.

At least one embodiment of the invention is directed to a soft starter which is suitable for performing the steps of the method according to at least one embodiment of the invention. The soft starter has a firing signal unit for generating firing signals and the thyristors. The firing signal unit may be controlled to generate firing signals for one or more of the thyristors. The soft starter also has device(s) which are suitable for performing the steps of at least one embodiment of the method described. These may include for example a control unit, which has a computing unit and a storage unit. A computer program may be loaded into the storage unit and permanently stored there, and can be loaded from there into the computing unit to be executed.

Furthermore, the computer program product comprises commands which have the effect that the firing signal unit of the soft starter according to at least one embodiment of the invention generates one or more firing signals for one or more thyristors if the decision for a firing possibility has been made. According to at least one embodiment of the invention, the computer program product is formed to implement and carry out at least one embodiment of the method outlined. In this case, the computer program product may bring together within itself all of the partial functions of the method, that is to say be monolithically formed. Alternatively, the computer program product may also be formed in a segmented manner and respectively distribute partial functions among segments which are executed on separate hardware. Thus, the computer program product may be formed such that it can be executed partially in a control unit of the soft starter and partially in an external control unit. Furthermore, one part of the method may be carried out in a soft starter device and another part of the method may be carried out in a control unit superordinate to the soft starter device, such as for example a PLC, a manual parameterization device or a computer cloud.

At least one embodiment of the invention is directed to a method for operating a three-phase cage motor on a multiphase electrical grid via a soft starter, including one or more grid phases of the grid being respectively switchable by firing thyristors, and apart from a grid-related firing criterion, a rotor-flux-related firing criterion is taken into account, both the grid-related firing criterion and the rotor-flux-related firing criterion being required to be satisfied for a firing decision for a firing possibility of one or more thyristors, the firing either being on a 2-phase basis or on a 3-phase basis with a 2-phase firing leading to a current vector fixed in alignment and pulsating in amplitude and a 3-phase firing leading to a rotating current vector in a space vector representation, the method comprising:

satisfying the grid-related firing criterion upon, in a space vector representation, the current vector of a firing possibility of two or more grid phases lying within a firing angle region defined by a lower firing angle region limit and an upper firing angle region limit in relation to at least one of a grid voltage of the grid and a grid current of the grid; and satisfying the rotor-flux-related firing criterion upon, in a space vector representation, the current vector of a firing possibility of two or more grid phases lying within a flux and torque angle region of which region limit values are defined in relation to the rotor flux.

At least one embodiment of the invention is directed to a soft starter for operating a three-phase cage motor on a multiphase electrical grid, including one or more grid phases of the grid being respectively switchable by firing thyristors, and apart from a grid-related firing criterion, a rotor-flux-related firing criterion is taken into account, both the grid-related firing criterion and the rotor-flux-related firing criterion being required to be satisfied for a firing decision for a firing possibility of one or more thyristors, the firing either being on a 2-phase basis or on a 3-phase basis with a 2-phase firing leading to a current vector fixed in alignment and pulsating in amplitude and a 3-phase firing leading to a rotating current vector in a space vector representation, the soft starter comprising:

at least one electronic circuit configured to check for:

satisfying the grid-related firing criterion upon, in a space vector representation, the current vector of a firing possibility of two or more grid phases lying within a firing angle region defined by a lower firing angle region limit and an upper firing angle region limit in relation to at least one of a grid voltage of the grid and a grid current of the grid; and satisfying the rotor-flux-related firing criterion upon, in a space vector representation, the current vector of a firing possibility of two or more grid phases lying within a flux and torque angle region of which region limit values are defined in relation to the rotor flux.

At least one embodiment of the invention is directed to a non-transitory computer program product, storing commands which, when executed by a soft starter, configure the soft starter to perform the method of an embodiment.

At least one embodiment of the invention is directed to a non-transitory computer-readable medium storing a computer program which, when executed by a soft starter, configure the soft starter to perform the method of an embodiment.

At least one embodiment of the invention is directed to a soft starter of an embodiment, wherein the at least one electronic circuit includes an ASIC.

At least one embodiment of the invention is directed to a soft starter of an embodiment, wherein the at least one electronic circuit includes at least one processor.

BRIEF DESCRIPTION OF THE DRAWINGS

The properties, features and advantages of this invention described above and also the manner in which they are achieved become clearer and more clearly understandable in connection with the following description of the example embodiments, which are explained more specifically in conjunction with the schematic drawings, in which:

FIG. 9 shows an illustration of the problem of zero crossing detection;

FIGS. 19 to 24 show a time series of a space vector diagram over a time period of 3.9 ms with a rotor flux vector, a voltage vector and a rotating stator current vector;

DETAILED DESCRIPTION OF THE EXAMPLE EMBODIMENTS

Figure 1:
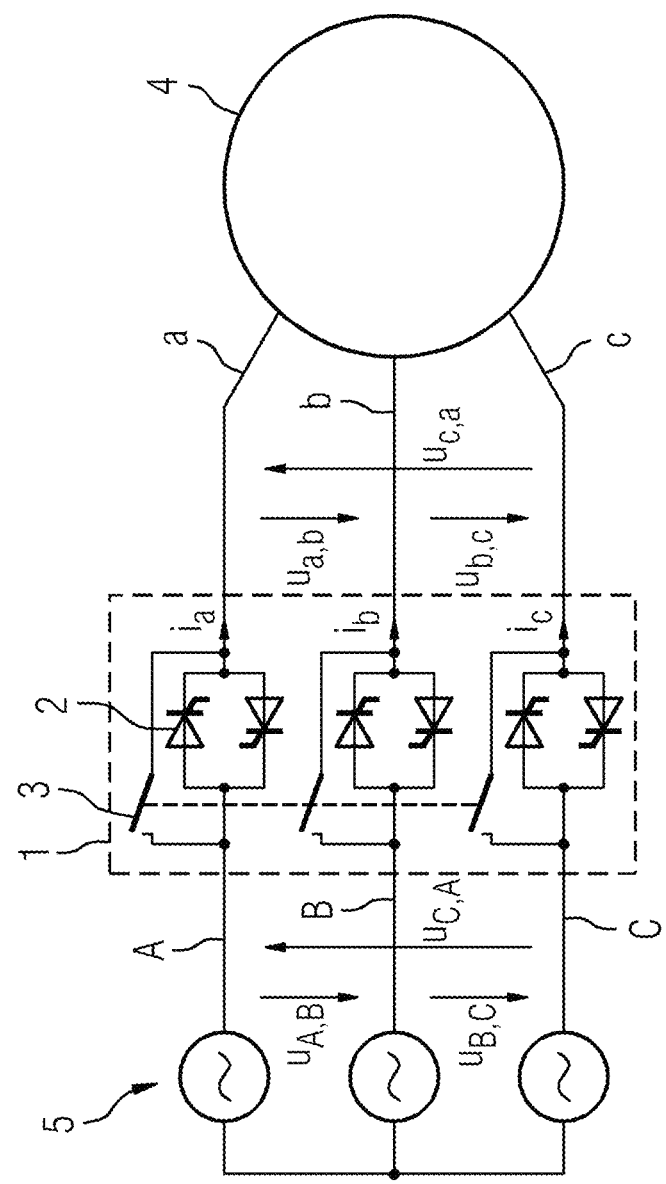
FIG. 1 shows a conventional soft starter topology.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. At least one embodiment of the present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/ DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

At least one embodiment is directed to a method. It is a method which serves for operating a three-phase cage motor on a multiphase electrical grid. Operation takes place with the aid of a soft starter, with which one or more grid phases of the grid can respectively be switched by firing thyristors. Apart from at least one grid-related firing criterion, the operating method additionally takes into account at least one rotor-flux-related firing criterion.

In this case, firing is either on a 2-phase basis or on a 3-phase basis, a 2-phase firing leading to a current vector which is fixed in its alignment and pulsating in its amplitude and a 3-phase firing leading to a rotating current vector in a space vector representation.

At least one embodiment of the invention is based on the idea that a decision to perform a firing of a thyristor is made in relation to a grid-related firing criterion, for example the position of the voltage vector, and a rotor-flux-related firing criterion, for example the position of the rotor flux vector. In this respect, the control method according to the invention differs fundamentally from conventional control methods, in which the rotor flux generated in the three-phase machine does not have any influence on a decision as to whether a thyristor firing is to be performed.

The method presented does not require any detailed motor parameters or predictions, but just a number of angle operations and comparisons, and is consequently many times simpler to implement in an industrial product than the known model-predictive control method. First estimates showed that the method according to the invention needs only about 10% of the computational power of the model-predictive control method. Furthermore, with the novel method, even closed-loop controlled operation is possible.

According to at least one embodiment of the invention, both the grid-related firing criterion and the rotor-flux-related firing criterion must be satisfied for a firing decision that a firing possibility of one or more thyristors is used. Each firing possibility is checked for whether it satisfies both the grid-related firing criterion and the rotor-flux-related firing criterion. Only in the case where a firing possibility satisfies both the grid-related firing criterion and the rotor-flux-related firing criterion can the firing possibility actually be used by a firing.

According to at least one embodiment of the invention, the grid-related firing criterion is satisfied if in a space vector representation the current vector of a firing possibility of two or more grid phases lies within a firing angle region which is defined by a lower firing angle region limit and an upper firing angle region limit in relation to the grid voltage and/or the grid current. The lower firing angle region limit determines the firing with which the current flow reaches the maximum length and the greatest current amplitude. The lower firing angle region limit may be prescribed in a way analogous to the firing angle $\alpha$ in the case of the classic control methods, for example by way of a characteristic curve, or be controlled in a closed-loop manner while taking into account the current amplitude. It is also possible to take into account the rotor flux amplitude at the time for limiting the maximum possible torque. Since the current and the torque can be controlled via the lower firing angle region limit, the function of the lower firing angle region limit is similar to that of the firing angle $\alpha$ in conventional control methods. The lower firing angle region limit may assume a value from the following definition region: [−90°; upper firing angle region limit], measured in relation to the vector of the grid voltage. The upper firing angle region limit indirectly defines the shortest current flow that can be initiated by a firing. The upper firing angle region limit may be chosen such that, even in the case of a grid in which it is difficult to determine where the current crosses zero, it is ensured that the firing always behaves in such a way that the current flows in the desired direction and there is no unwanted firing with a current amplitude that is much too high.

According to at least one embodiment of the invention, the rotor-flux-related firing criterion is satisfied if in a space vector representation the current vector of a firing possibility of two or more grid phases lies within a flux and torque angle region of which the region limit values are defined in relation to the rotor flux. The choice of one of the region limit values of the flux and torque angle region allows regions in which the firings induce on average a positive torque and a negative torque to be separated from one another. Depending on the choice of this region limit value, for example a slightly negative torque is allowed, in favor of a strongly rotor-flux-forming current. With the other region limit value of the flux and torque angle region it can be defined how much positive torque and how much rotor flux linkage is generated in the rotor: it may be that building up positive torque has the effect of reducing rotor flux, and vice versa. The choice of this other region limit value must therefore be closely scrutinized. This parameter may be used for "flux guidance" or "flux control" during running-up. By use of this limit value, therefore, the average absolute rotor flux $|\vec{\Psi}_2^S|$ can be influenced. If the motor is to be accelerated, the difference in the region limit values of the flux and torque angle region can assume a value from the following definition region: [90°, 180°], measured in relation to the vector of the rotor flux.

According to a preferred configuration of at least one embodiment of the invention, the existence of a firing criterion is checked on the basis of a space vector representation of rotor flux $\vec{\Psi}_2^S$, grid voltage $\vec{U}_1^S$ and stator current $\vec{I}_1^S$. With the aid of a space vector representation, the relationships between the grid variables of voltage and current, the rotor flux variables, the firing angle region and the flux and torque angle region can be clearly shown. In the space vector representation, the main difference between the present invention and the conventional control methods is that the rotor flux space vector is taken into account in the choice of a firing instant. The calculation of a grid space vector, for example the voltage space vector, and the rotor-flux space vector and the firing angle region and the flux and torque angle region may take place cyclically. Each time a firing possibility lies in the firing angle and flux and torque angle regions, an open-loop thyristor control may take place. That leads to firing pulses which take into account both the grid voltage and the rotor flux. In this way, a positive torque, a limited stator current and a rotor flux sufficient for subsequent firings can be obtained.

According to a preferred configuration of at least one embodiment of the invention, the flux and torque angle region is displaced by an angle of rotation in order to compensate for a time delay between a firing decision and the firing. This can reduce the effect that, because of the rotating rotor, estimates of the positive torque and rotor flux development are made on a different basis than they actually occur during the firing. The rotation by the angle of rotation performed in the space vector representation has the purpose of compensating in the best possible way for the deviation due to the rotating rotor.

According to a preferred configuration of at least one embodiment of the invention, the three-phase cage motor is an asynchronous motor, a synchronous motor or a line start PM motor (PM=permanent magnet).

According to a preferred configuration of at least one embodiment of the invention, the checking of grid-related and rotor-flux-related firing criteria is preceded by a time phase of flux build-up, in which rotor flux is generated by firings of thyristors.

According to a preferred configuration of at least one embodiment of the invention, only those firing possibilities that result in negative torques, and consequently actively brake the three-phase cage motor, are determined. Consequently, the method can also be used for active braking.

At least one embodiment of the invention is directed to a soft starter which is suitable for performing the steps of the method according to at least one embodiment of the invention. The soft starter has a firing signal unit for generating firing signals and the thyristors. The firing signal unit may be controlled to generate firing signals for one or more of the thyristors. The soft starter also has device(s) which are suitable for performing the steps of at least one embodiment of the method described. These may include for example a control unit, which has a computing unit and a storage unit. A computer program may be loaded into the storage unit and permanently stored there, and can be loaded from there into the computing unit to be executed.

At least one embodiment is also directed to a computer program product and also a computer-readable medium on which the computer program product is stored. The computer program product is formed such that it can be executed on at least one processor. The computer program product may be storable in a memory as software, for example as an app that can be downloaded from the Internet, or as firmware and may be formed such that it can be executed by a processor or an arithmetic and logic unit. Alternatively or additionally, the computer program product may also be formed at least partially as a hardwired circuit, for example as an ASIC (ASIC=Application-Specific Integrated Circuit). The computer program product according to the invention comprises commands which have the effect that the soft starter according to the invention performs the method steps of the method described. The computer program product is therefore formed to carry out the method for operating a three-phase cage motor via a soft starter. In particular, it is formed to take into account not only a grid-related firing criterion but also a rotor-flux-related firing criterion.

Furthermore, the computer program product comprises commands which have the effect that the firing signal unit of the soft starter according to at least one embodiment of the invention generates one or more firing signals for one or more thyristors if the decision for a firing possibility has been made. According to at least one embodiment of the invention, the computer program product is formed to implement and carry out at least one embodiment of the method outlined. In this case, the computer program product may bring together within itself all of the partial functions of the method, that is to say be monolithically formed. Alternatively, the computer program product may also be formed in a segmented manner and respectively distribute partial functions among segments which are executed on separate hardware. Thus, the computer program product may be formed such that it can be executed partially in a control unit of the soft starter and partially in an external control unit. Furthermore, one part of the method may be carried out in a soft starter device and another part of the method may be carried out in a control unit superordinate to the soft starter device, such as for example a PLC, a manual parameterization device or a computer cloud.

FIG. 1 shows a typical soft starter topology with a soft starter 1, connected between a three-phase electrical grid 5 and an asynchronous motor (=ASM) 4, for starting the ASM 4, each with an antiparallel-connected pair of thyristors 2 and each with a bypass contact 3 per phase a, b, c. The current $i_a$, $i_b$, $i_c$ is measured on the motor side in all three phases a, b, c. In addition, the soft starter 1 uses grid-side line-to-line measurements $u_{A,B}$, $u_{B,C}$, $u_{C,A}$, in order to calculate the grid voltages $u_A$, $u_B$, $u_C$, and motor-side line-to-line measurements $u_{a,b}$, $u_{b,c}$, $u_{c,a}$, in order to calculate the motor voltages $u_a$, $u_b$, $u_c$. Similar topologies, in which however only two or three grid phases can be switched in the soft starter, can be found in the Siemens equipment handbook Sanft-starter SIRIUS 3RW50, Siemens AG, Amberg, 09/2019, A5E35628455001A/RS-AA/001, Chapter A.1, the entire contents of which are hereby incorporated herein by reference.

Figure 2:
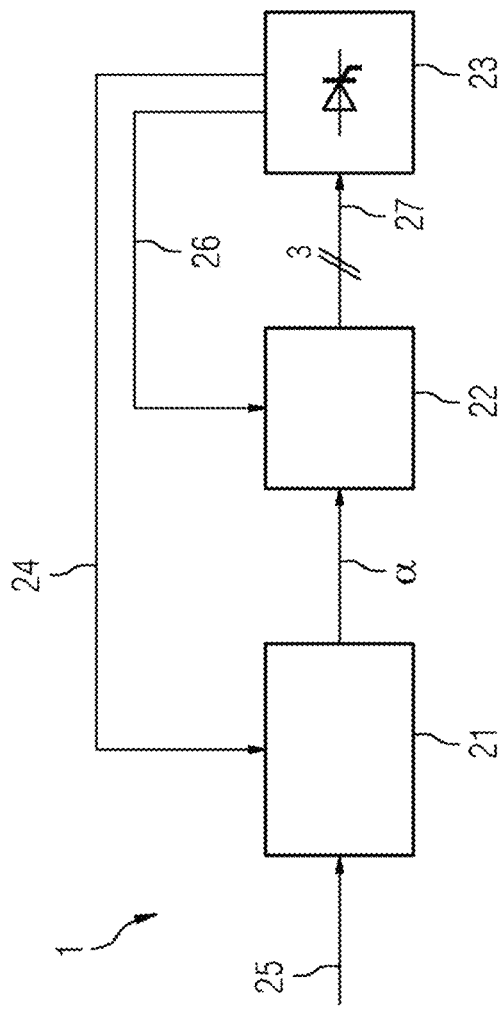
FIG. 2 shows a conventional structure for generating control pulses.

Although the functional scope of soft starters has been continually increased in recent decades, for example by a voltage ramp, current-limited operation, torque-controlled running-up and speed-controlled running-up, the structure for generating control pulses has remained the same in the essential fundamentals and has the structure shown in FIG. 2, which substantially comprises three blocks, which are explained below:

In a first block of the soft starter 1, the controller 21, the manipulated variable of the firing angle $\alpha$, also known as the control angle, is generated by a control structure from measured values 24 such as the stator current $I_{1,RMS}$, the stator voltage $U_{1,RMS}$ and/or the rotor speed n of the motor. The firing angle $\alpha$ may be influenced by input parameters 25, for example the motor torque at the time, the maximum setpoint current or a speed ramp, such that the behavior becomes optimal for the application. The firing angle $\alpha$ defines the RMS value of the voltages applied to the individual phases a, b, c of the motor (RMS=Root-Mean-Square). A simple way of generating a firing angle $\alpha$ is a voltage ramp, independently of the load reaction; for this purpose, the firing angle $\alpha$ is simply increased as a function of time. It is necessary to begin here with a sufficiently great initial value of the firing angle $\alpha$ in order that the initial motor torque $M_M$ is already greater than the load torque ML; otherwise, the motor current would not accelerate the rotor and would only produce high losses while remaining at a standstill until the motor torque is high enough to accelerate the rotor.

A second block of the soft starter 1, a control signal block 22, serves for generating control signals 27 for initiating thyristor firings, the control signals 27 being generated in dependence on a measured voltage, for example the grid voltage 26, and/or a measured current, preferably with a defined time between a switching off of a thyristor that takes place when the current goes below a minimum value and a renewed firing of the thyristor.

A third block of the soft starter 1, a hardware block 23, comprises thyristors and firing devices, for example a firing signal unit; it uses the control signals 27 received from the control signal block 22 for generating the output voltage.

Figure 3:
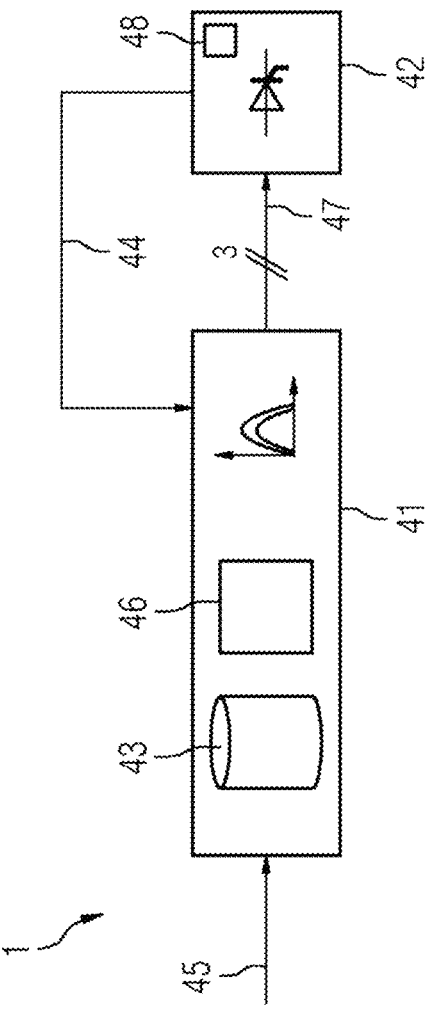
FIG. 3 shows a structure for generating control pulses according to a model-predictive method.

FIG. 3 shows a structure for generating control pulses according to a model-predictive control method, as described in the European patent application EP20176295.2 and also in Nannen et al., the entire contents of each of which are hereby incorporated herein by reference. The soft starter 1 may be used for example in a topology such as that shown in FIG. 1. The soft starter 1 has a control unit 41 with a computing unit 46, also referred to as a processor, and a storing unit 43. The computing unit 46 executes a computer program, which is stored in the storing unit 43 and contains an algorithm for performing the method. When performing the algorithm, firing possibilities for at least one nearest time increment are determined, the motor behavior corresponding to the firing possibilities is precalculated with the aid of a motor model and finally a decision as to whether and which firing possibility is to be chosen is made on the basis of the predicted motor behavior. For initializing the algorithm, state variables of the system are measured or calculated. The computing unit 46 receives a series of measured values 44, for example the motor current $I_1$, the motor voltage $U_1$ and the speed n of the rotor, as input values. Grid voltages $u_A$, $u_B$, $u_C$ are measured, in order to calculate the grid angle $\varphi_{grid}$ and the grid voltage amplitude $U_{grid}$. The motor currents $i_a$, $i_b$, $i_c$ and motor voltages $u_a$, $u_b$, $u_c$ are also used for a model-based calculation of the rotor flux. Together with the measured mechanical rotor speed n and the grid frequency $f_{grid}$, all of the system variables are defined. After the prediction, it has been established which possibilities there are for firing at the point in time under consideration in the future, i.e. which firing possibilities there are. These firing possibilities can then be checked and assessed with respect to a multiplicity of decision criteria 45, for example a maximum torque or a maximum stator current. If the decision for a specific firing possibility has been made, the control 41 generates one or more control signals 47 to a firing block 42 of the soft starter 1, which has thyristors and a firing signal unit 48 for generating firing signals for the thyristors. The control signals 47 cause the firing signal unit 48 to generate firing signals for one or more of the thyristors, so that the precalculated motor behavior occurs.

Basis—Space Vector Representation

Space vector representations form the basis for the present description of the invention: they offer the possibility of representing multiphase physical variables that occur in a multiphase grid in a simpler, two-axis coordinate system with the axes α, β as space vectors rotating about the zero point or simply: vectors. The transfer into the α-β coordinate system takes place by applying the Clarke transformation. By way of space vectors, physical variables can be represented in the system at each point in time; in the case of the present invention, these are especially magnetic flux, voltage and current.

Figure 4:
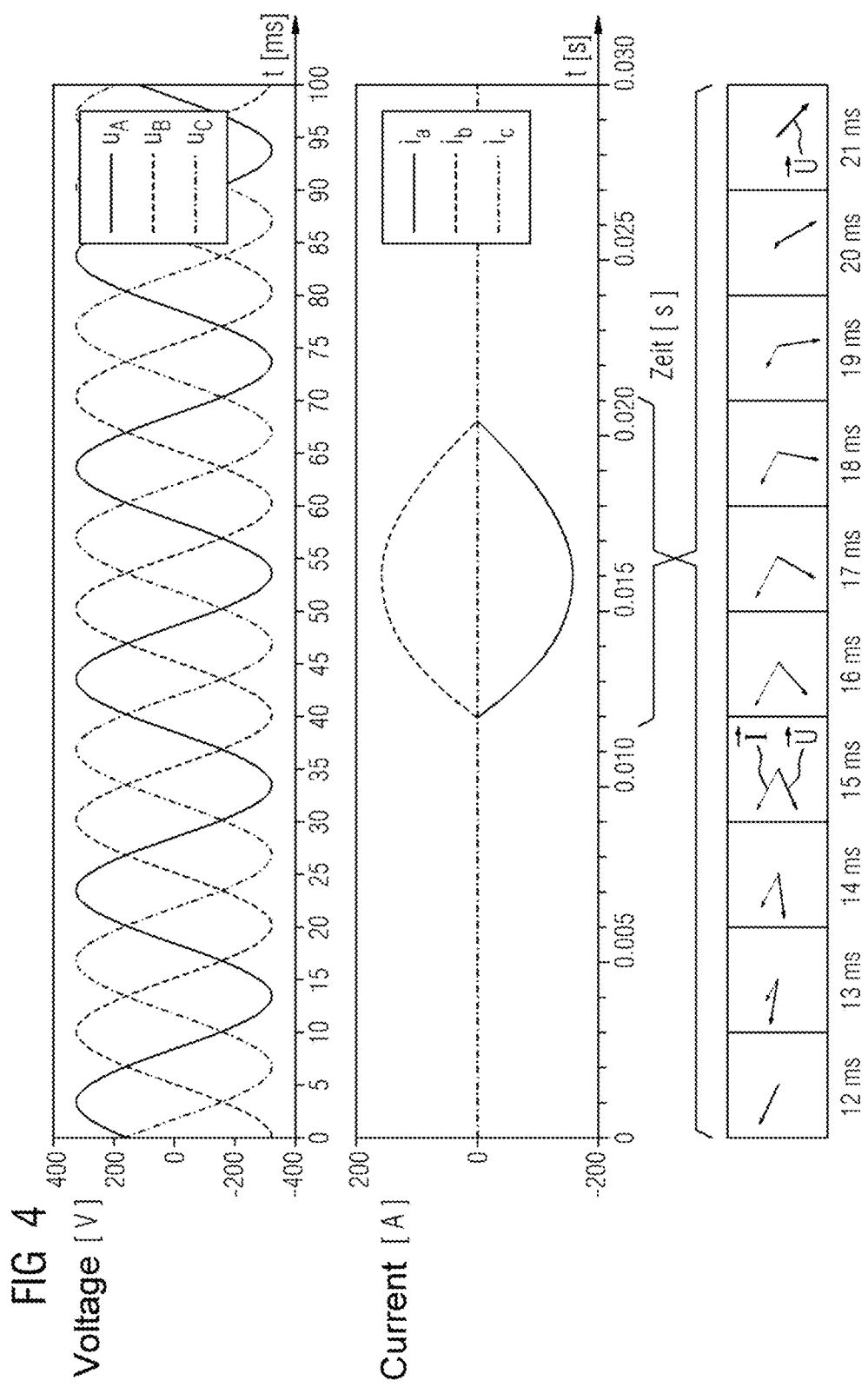
FIG. 4 shows an example of a space vector representation.

FIG. 4 shows an example of a space vector representation: in the upper part of FIG. 4, a conventional representation of the profile of a three-phase alternating voltage U and a stator current I, referred to as the motor current, is shown over time. The three-phase alternating voltage U originates from a customary 50 Hz supply grid and consists of three individual sinusoidal alternating voltages $u_A$, $u_B$, $u_C$ of the same frequency with a peak value of 325 V, which are fixedly displaced in relation to one another in their phase angles by 120°. The voltage profile is represented over the time period from 0 to 100 ms. The motor current $i_a$, $i_b$, $i_c$ in the three motor phases a, b, c, represented over the time period from 0 to 30 ms, was generated by a one-off two-phase firing in the phases a and b at the point in time 12 ms in a configuration as in FIG. 1, with a soft starter and a connected motor.

The lower part of FIG. 4 shows in the time interval from 12 ms to 21 ms space vector representations of the voltage and current, in time increments of 1 ms. The scaling of the vectors is irrelevant here for the analysis. With a thicker line thickness, the voltage vector $\vec{U}$ is represented, with a thinner line thickness the current vector $\vec{I}$. At the point in time t=12 ms, as yet no current is flowing; accordingly, only the voltage vector $\vec{U}$ can be seen. In a comparison of the images at the points in time t=12 ms and t=13 ms, it is initially noticeable that the voltage vector $\vec{U}$ has rotated a little further. This can also be seen at the subsequent time increments. According to the three-phase alternating voltage, it is a rotating voltage vector $\vec{U}$, which rotates proportionally to the grid frequency $f_{grid}$=50 Hz: the voltage vector $\vec{U}$ rotates with an angular frequency $\omega=2\pi f_{grid}=2\pi$ 50 Hz=$2\pi/(20$ ms) counterclockwise about the zero point respectively lying at the center of the time increment window. The amplitude, and consequently the vector length, of the voltage vector $\vec{U}$ remain constant in the ideal grid, in which no impedance and no voltage drops on the line exist. In the space vector representation, it can also be seen at the point in time t=13 ms that the incipient flow of current leads to a current vector $\vec{I}$ that is initially still of a small magnitude. It can be seen from the space vector representations at the subsequent time increments that the current vector $\vec{I}$ keeps increasing its length, while its direction remains constant; this is typical of two-phase firings. At the point in time t=16 ms, the current vector $\vec{I}$ has reached its maximum, from then on reduces its length in each time increment, until at the point in time t=21 ms the current flow has ended.

This example shows how, with the aid of the space vector representation, relationships between different physical variables, here: voltage and current, can be clearly represented.

Basis—Two-Phase Firings

With the soft starter, various firings are possible, initiating a different behavior of the motor. It is either fired on a two-phase basis (phases a&b, b&c, c&a) or on a three-phase basis (phases a&b&c). As already shown in FIG. 4, the 2-phase firing leads to current vectors that are fixed in their alignment and pulsating in their amplitude.

If the thyristors in the two grid phases a, b of the three grid phases a, b, c are fired, these phases a, b become current-conducting, whereas the thyristor in the third phase c remains current-blocking. Because the sum of the currents I in all three phases a, b, c always has to be zero, the current that flows toward the motor in one of the conducting phases a, b is identical to the current that flows away from the motor in the other conducting phase; therefore, the current amplitudes in the two conducting phases a, b are exactly the same, just with an opposite sign.

Figure 5:
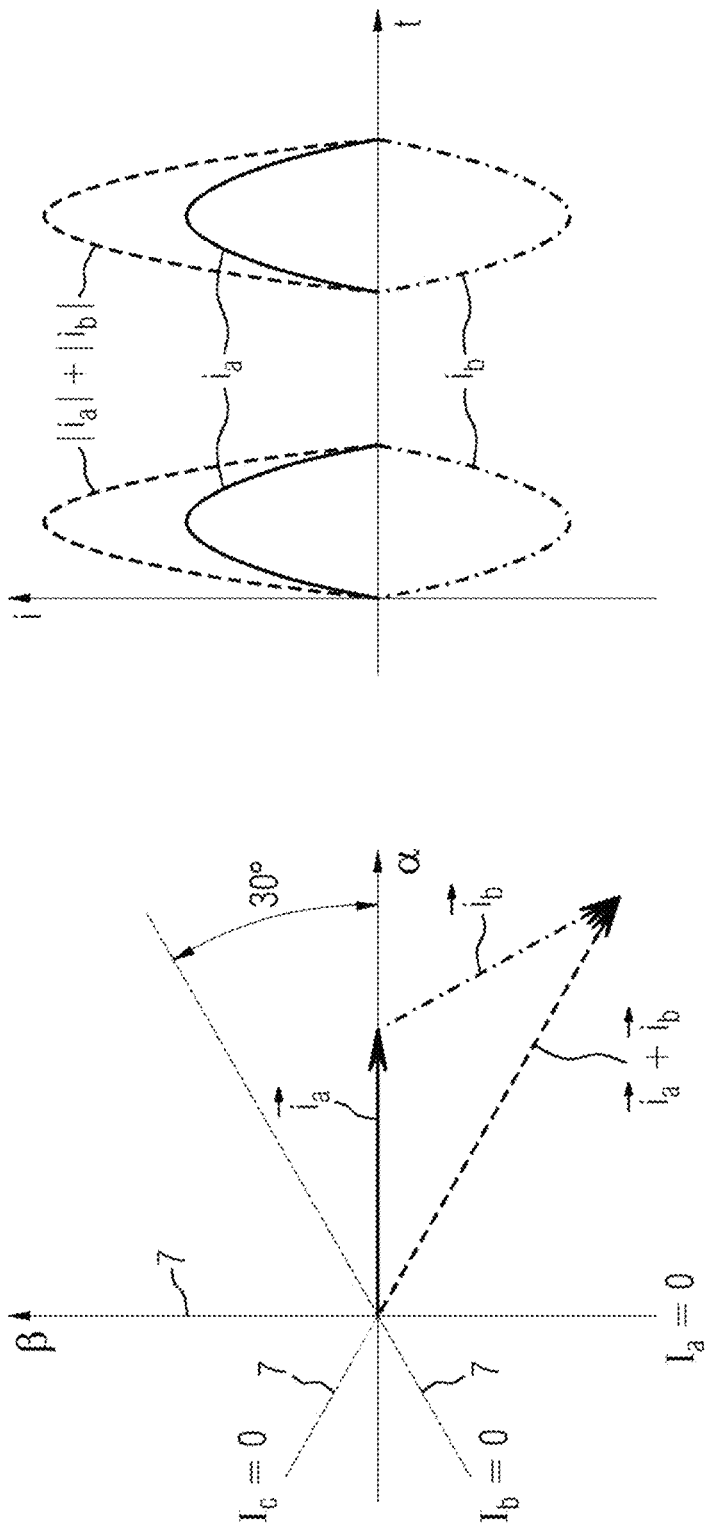
FIG. 5 shows a representation of a pulsating current vector after a two-phase firing of the phases a and b in the α-β coordinate system.

FIG. 5 concerns a 2-phase firing of the phases a and b. In the diagram on the left of FIG. 5, it is obvious in a fixed α-β coordinate system that this condition leads to a pulsating current vector $\vec{1}_a+\vec{1}_b$ along the path $I_c=0$, the current vector $\vec{1}_a+\vec{1}_b$ varying in length but its direction remaining constant. Therefore, only the absolute value $|i_a+i_b|$ of the current vector $\vec{1}_a+\vec{1}_b$ varies. Two-phase firings therefore result in fixed paths 7, on which pulsating current space vectors can be generated; in the diagram on the left of FIG. 5, these paths 7 are indicated by $I_a=0$, $I_b=0$ and $I_c=0$, the path $I_a=0$ running along the β axis and the path $I_b=0$ forming an angle of 30° with the α axis; each of the paths 7 forms an angle of 60° with the next-closest path 7. In the case of a three-phase firing, on the other hand, the current also forms a rotating space vector—similar to in the case of the voltage. In the diagram on the right of FIG. 5, the current amplitudes $i_a$, $i_b$ in the two conducting phases a, b and also the absolute value $|i_a|+|i_b|$ of the current vector generated by a 2-phase firing are represented over the time t.

Basis—Motor Modeling and Rotating Operations

At least one embodiment of the present invention can be applied generally to a three-phase machine that is connected to a soft starter. In this case, the three-phase cage motor may be formed as an asynchronous machine, a synchronous machine or a line-start PM motor.

An asynchronous motor modeling was explained in detail in the European patent application mentioned in the introductory part of the description, EP20176295.2, and also in Nannen et al. All of the definitions given there for symbols are also used in the present description. The motor model equations described in these publications that are taken as a basis here are:

$$\frac{d\vec{I}_1^S}{dt} = \frac{1}{\sigma \cdot L_1} \cdot \vec{U}_1^S - \frac{R_1 \cdot L_2^2 - R_2 \cdot L_h^2}{\sigma \cdot L_1 \cdot L_2^2} \cdot \vec{I}_1^S + \frac{R_2 \cdot L_h}{\sigma \cdot L_1 \cdot L_2^2} \cdot \vec{\Psi}_2^S -$$
$$j \cdot \frac{\Omega_L \cdot L_h}{\sigma \cdot L_1 \cdot L_2} \cdot \vec{\Psi}_2^S$$

$$\frac{d\vec{\Psi}_2^S}{dt} = \frac{R_2 \cdot L_h}{L_2} \cdot \vec{I}_1^S - \frac{R_2}{L_2} \cdot \vec{\Psi}_2^S + j \cdot \Omega_L \cdot \vec{\Psi}_2^S \quad (1)$$

$$M_M = \frac{3}{2} \cdot p \cdot \frac{L_h}{L_2} \cdot \vec{\Psi}_2^S \times \vec{I}_1^S \quad (2)$$

The subscripted index (subscript) 1 identifies a stator-related variable, the subscripted index 2 a rotor-related variable. The superscripted index (superscript) S indicates that the variable relates to a stator-fixed coordinate system. The motor model uses the stator current $\vec{I}_1^S$, the scattering coefficient σ (Blondel's coefficient), the inductances $L_1$, $L_2$, the voltage $\vec{U}_1^S$, the resistances $R_1$, $R_2$, the linked rotor flux $\vec{\Psi}_2^S$, the mutual inductance $L_h$, the rotor speed $\Omega_L$ and the rotor torque $M_M$.

In the European patent application EP20176295.2 and in Nannen et al., a coordinate transformation, which rotates the coordinates in the α-β coordinate system by the angle of rotation $\varphi_K$, is introduced at this point:

$$\vec{I}_1^K = \vec{I}_1^S \cdot e^{-j\varphi_K} \quad (3)$$

The angle of rotation $\varphi_K$ is in this case chosen such that, after completion of the rotation, the rotor flux vector $\vec{\Psi}_2^S$ points in the positive direction of the d axis of the d-q coordinate system. The value d depicts the magnetic flux density of the magnetic excitation in the rotor, and q is an expression of the torque generated by the rotor. To clarify: all of the vectors are thus rotated in the α-β coordinate system by the angle $\vec{\varphi}_K$. Correspondingly, the following is obtained for the current:

$$\vec{I}_1^K = I_{1d} + jI_{1a} \quad (4)$$

This rotating operation is the basis for the entire theory of the field-oriented closed-loop control of motors at the converter and is performed here in order to make the operations under consideration easier to understand. Reference is made in this connection to the rotor flux orientation. In the equations (3) and (4), the index K indicates that the indexed variable relates to any coordinate system.

Figure 6:
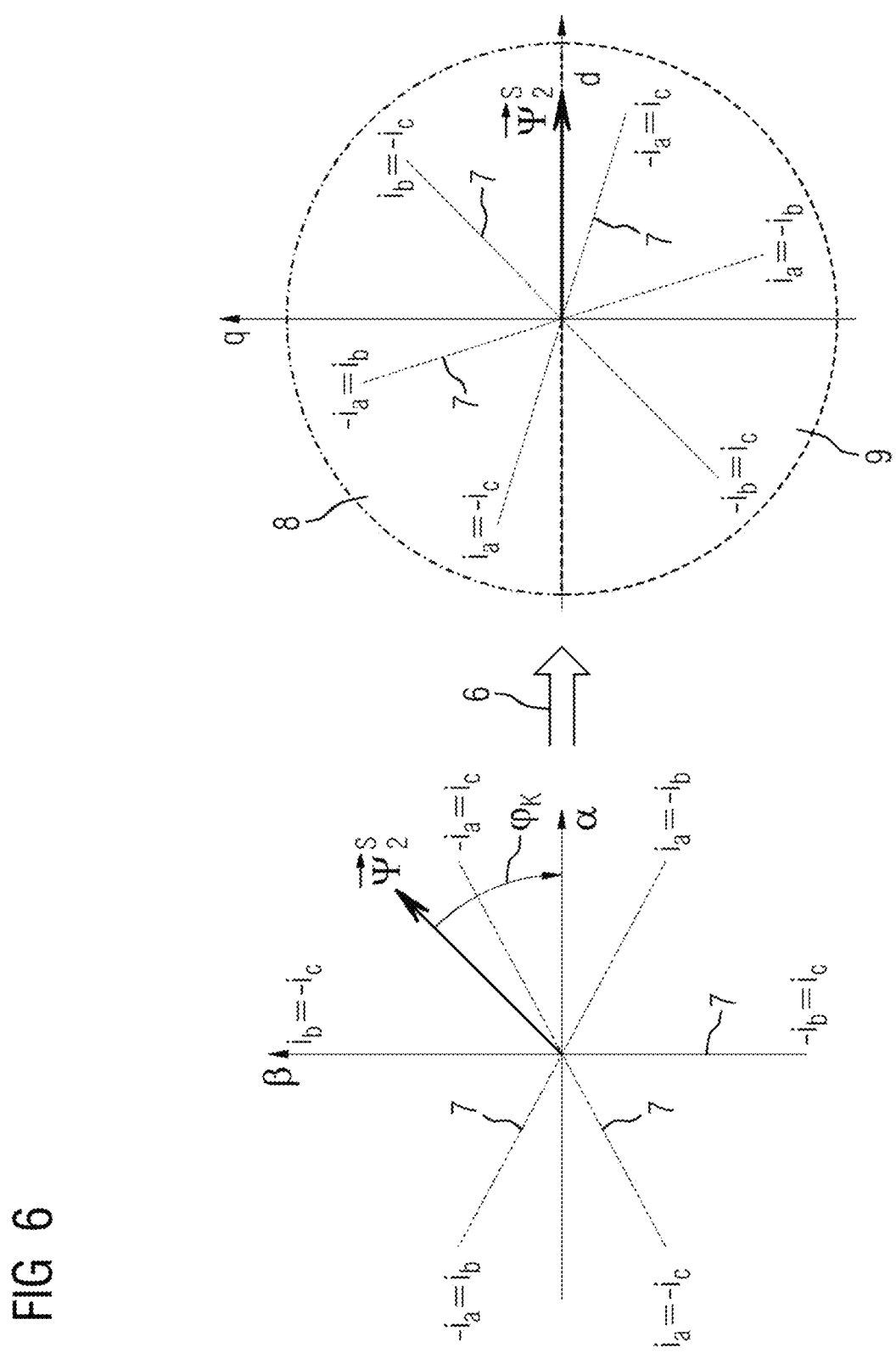
FIG. 6 shows a representation of a rotating operation between a space vector diagram in an α-β coordinate system and a space vector diagram in a d-q coordinate system.

FIG. 6 illustrates the rotating operation: in the left part of FIG. 6, the position of the flux vector $\vec{\Psi}_2^S$ before the rotation by the angle of rotation $\varphi_K$ is shown and indicates the rotation of the flux vector by the angle of rotation $\varphi_K$. As explained above in relation to FIG. 5, a 2-phase firing leads to a current vector with a fixed direction, but pulsating amplitude. These fixed directions of the current vector that are obtained with the three possible 2-phase firing combinations a&b, b&c, a&c, are depicted in FIG. 6 by dashed lines 7; in this description, these fixed directions 7, in which the current vector generated by a 2-phase firing pulsates, are also referred to as paths.

This rotating operation 6 has the effect that the flux vector $\vec{\Psi}_2^S$ and the paths 7 are brought into the positions shown in the right part of FIG. 6: the flux vector $\vec{\Psi}_2^S$ points in the direction of the d axis.

In the d-q coordinate system it is possible to distinguish between a first region 8 with firings for a positive torque, comprising the half-space with positive q values outlined by dash-dotted lines, and a second region 9 with firings for a negative torque, comprising the half-space with negative q values outlined by dashed lines, which are adjacent to one another along the d axis.

The representation obtained by the rotating operation 6, in which the d-q coordinate system is aligned at the rotor flux vector $\vec{\Psi}_2^S$ z at each point in time, that is to say the entire rotor flux lies in the d direction, makes it possible to divide the current into a field-forming current, which corresponds to the current vector component along the d axis, and a torque-forming current, which corresponds to the current vector component along the q axis.

One of the greatest advantages of the representation in the d-q coordinate system is that the equation (2) for the motor torque $M_M$ is greatly simplified and becomes a simple multiplication:

$$M_M = \frac{3}{2} \cdot p \cdot \frac{L_h}{L_2} \cdot \Psi_{2d} \cdot I_{1q} \quad (5)$$

$\Psi_{2d}$ is the d component of the linked rotor flux in the d-q coordinate system, $I_{1q}$ is the q component of the stator current in the d-q coordinate system: only the mutually perpendicular components of the rotor flux and the stator current contribute to the motor torque.

Figure 7:
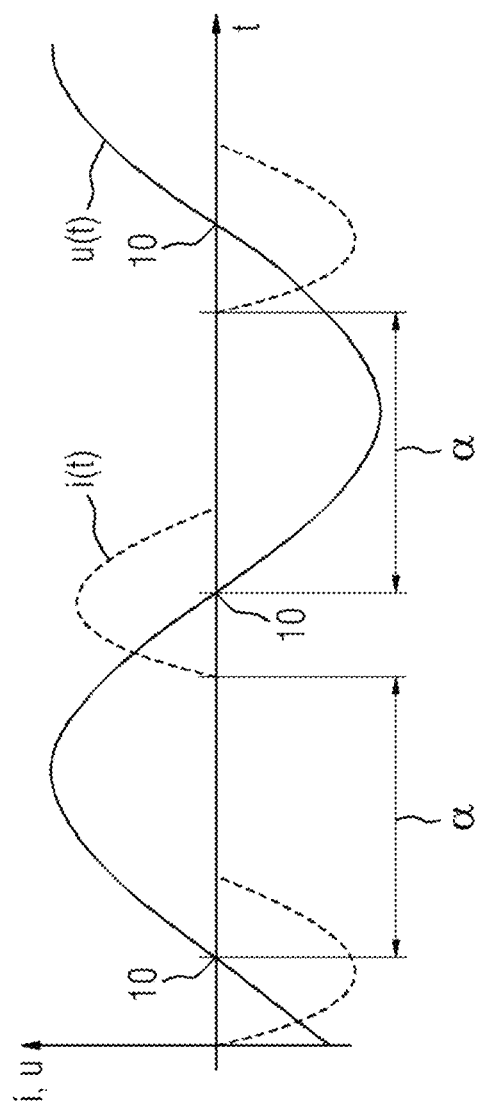
FIG. 7 shows a representation of the definition of the firing angle α.

Basis—Transfer of Classic Methods with Firing Angles into the Vector Representation The methods for controlling soft starters that are customary today in industry are based on a firing angle α. This may be related to the grid voltage position or to the phase current. The algorithm that is customary today is used as a starting point for deriving the firing algorithm according to the invention, which requires relatively little computational power. FIG. 7 illustrates the conventional definition of the firing angle α, which fixes the firing instant in relation to the grid voltage, to be more precise: in relation to the zero crossings 10 of the grid voltage. A firing of the thyristors is therefore always at a fixed distance α from the directly preceding grid voltage zero crossing 10. FIG. 7 also shows the current pulses i(t) initiated by the respective firings as dashed curves; the sign of a current pulse i(t) corresponds to the sign of the voltage u(t) at the respective firing instant.

This conventional definition of the firing angle α makes it difficult to integrate further criteria with regard to a firing decision: since an exact firing instant at which the firing must take place is fixed, a further criterion could therefore only influence whether or not the firing takes place at all. Since this restrictive definition does not allow any latitude for the inclusion of a further criterion, for example the inclusion of the rotor flux as a further firing criterion in addition to the grid angle/grid voltage zero crossing, this definition is modified in the way represented in FIG. 8: instead of a specific firing instant, the firing angle α, an angle region, the so-called firing angle region 11, within which the firing instant is intended to lie, is thus defined. The firing angle region 11 is also referred to as the firing sector or firing window. The firing instant may be chosen from a range of values [$α_{min}$; $α_{max}$], which is delimited by a lower limit value $α_{min}$, the minimum firing angle, and an upper limit value $α_{max}$, the maximum firing angle. The introduction of the firing angle region 11 provides the possibility of more alternatives in the choice of a firing instant, since not just an instant but an angle region, and consequently a time period, is available for the firing. Compared with the reference point "voltage zero crossing" of the conventional firing angle α, the reference point of the firing window is displaced by 90 degrees. It goes without saying that other configurations in which the width of the firing window 11 is equal to zero ($α_{min}=α_{max}$), i.e. only a single firing instant is possible, are also possible.

Figure 8:
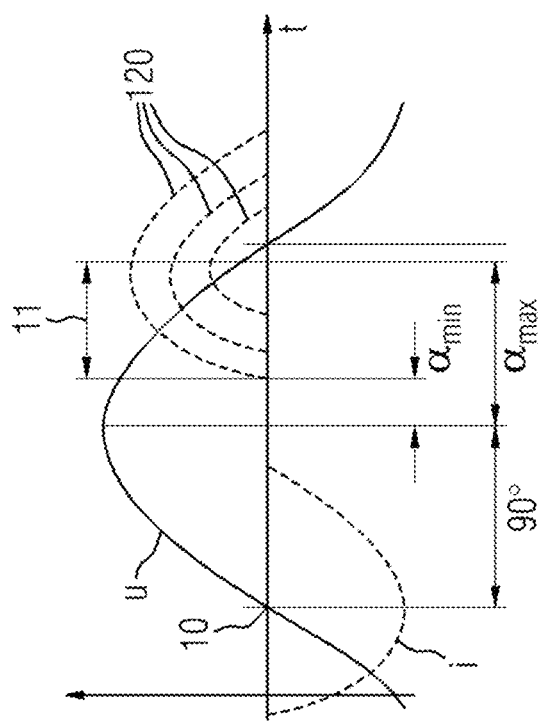
FIG. 8 shows a representation of the definition of the firing angle region $[\alpha_{min}; \alpha_{max}]$.

On account of the introduction of a firing window, not only a single current pulse, as represented in FIG. 7 as i(t), is possible, but a group of current pulses 120, as indicated in FIG. 8 as dashed curves. As FIG. 8 shows, when the smallest angle $α_{min}$ is chosen, a current pulse 120 with the greatest possible current amplitude is obtained. The greater the firing angle α is chosen to be, i.e. the more the firing angle approaches the upper limit value $α_{max}$, the smaller the current amplitude of the resultant current pulse 120 becomes; when the greatest angle $α_{max}$ is chosen, a current pulse 120 with the smallest possible current amplitude is obtained. Considering the asynchronous motor basically as a load explains this relationship: in very simplified terms, an asynchronous motor can be represented as a series connection of an inductance and a resistance; it therefore always has an ohmic-inductive effect. This has the consequence that the current that flows as a result of an applied voltage always follows it in time. For the generation of the control pulses, this means that the firing must always be performed before the associated voltage zero crossing 10. The further before the voltage zero crossing 10 the firing takes place, the greater the resultant current.

It can be ensured by the choice of the upper limit value Amax of the firing angle region 11 that, even in a case where the voltage zero crossing detection does not exactly detect the zero crossing, no unexpected firing pulse is generated; such unexpected firing pulses may damage the soft starter motor system because of their very high current amplitudes. FIG. 9 illustrates in an example the consequences that can occur if a zero crossing of the grid voltage is not correctly detected: the amplitude of a sinusoidal grid voltage u(t) is plotted over time t. A firing of the thyristors takes place at a fixed angular distance α from the zero crossings 10 of the grid voltage u(t). On account of high harmonic loading or distortions in the region before and after the zero crossing 10 of the grid voltage, a non-sinusoidal voltage region 51 may be produced. The theoretical zero crossing 10' of the ideal grid voltage u'(t) is delayed by a delay period 52 as a result of the non-sinusoidal voltage region 51; correspondingly, the measuring of the firing angle α does not begin at the theoretical zero crossing 10', but at the actually measured zero crossing 10. Therefore, because of the delay of the last voltage zero crossing 10, the following firing Z does not take place before but rather after the renewed voltage zero crossing 10: consequently, instead of a very great firing angle, a very small firing angle is set, and consequently a second current pulse i2(t) is generated, the amplitude of which is greater by a multiple than that of the preceding first current pulse i1(t). Such an unfavorable scenario can be ruled out by an appropriate choice of the upper limit value αmax of the firing angle region 11, so that only those firing pulses that lead to acceptable current amplitudes are allowed through, even if there are uncertainties in the system with regard to the zero crossing of the grid voltage.

Flux-Oriented Starting Algorithm for Soft-Starter-Controlled Induction Motors

The foregoing principles and relationships form the basis for the explanation of the invention. The following conclusion can be drawn from equation (5): if the stator current $I_{1q}$ has a positive value, a positive torque is produced; if the sign is negative, a negative torque is produced. This can be used for the assessment of firing possibilities.

To draw further conclusions, it is now assumed for the sake of simplicity that there is a rotor flux $\Psi_2$ with a d component $\Psi_{2d}$ of such a magnitude as to produce (see equation 5) a torque which can set the motor in a measurable rotating motion, but the rotor does not turn. Furthermore, it is known how the paths 7 of the two-phase firings that are possible in principle run in the α-β coordinate system. Therefore, it can be determined exactly with which firing a positive torque can be generated, see the half-space 8 outlined by dashed lines in FIG. 10, and with which firing a negative torque can be generated, see the half-space 9 outlined by dash-dotted lines in FIG. 10.

Figure 11:
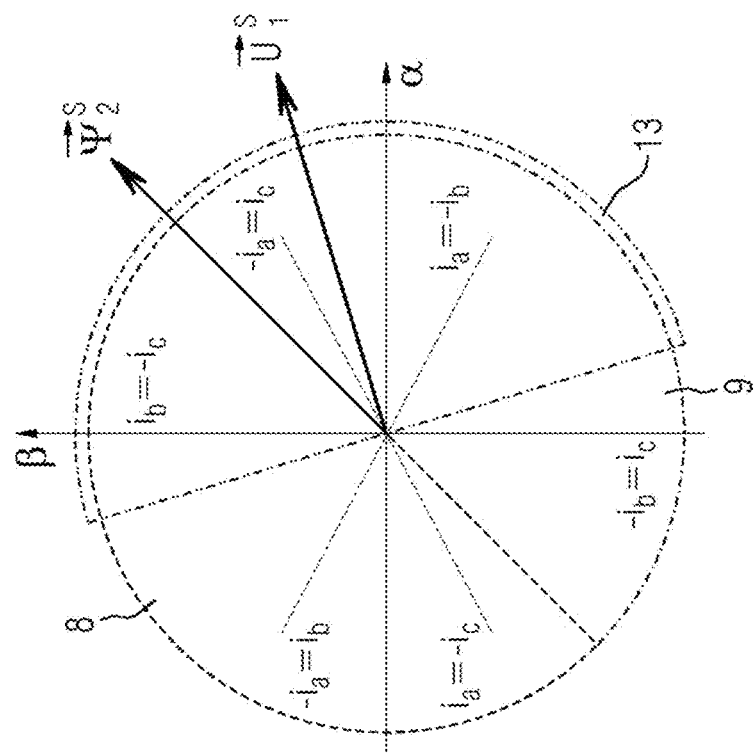
FIG. 11 shows a space vector diagram with a rotor flux vector, a voltage vector and a region with possible firings.

It is however the case that the grid is described in the space vector representation by a voltage vector that rotates with the grid voltage angular frequency. Consequently, not all firing possibilities can be implemented, but only those that lie in the theoretically possible region, which in the space vector representation is the half-space from +90° to −90° around the voltage vector. This is illustrated in FIG. 11: in it, the space vector diagram from FIG. 10 has been supplemented by a voltage vector $\vec{U}_1^S$ given by way of example and a region 13, in which the possible firings lie. In FIG. 11, the region 13 in which those firing setups (paths) that are possible on the basis of the grid position has been added in comparison with FIG. 10.

Figure 12:
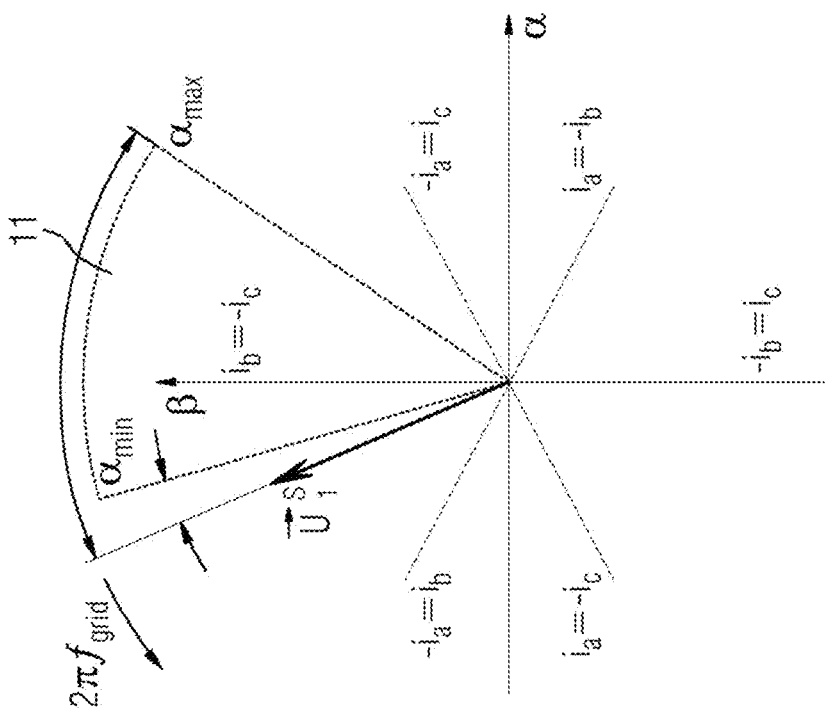
FIG. 12 shows a space vector diagram with a voltage vector and a firing window.

The inclusion of the voltage vector $\vec{U}_1^S$ means that now all of the firing possibilities that are physically possible at this point in time are shown, i.e. those firing possibilities that lie in the region 13. However, it is consequently not clear how great the maximum amplitude of the resultant current becomes. In order to define a degree of restriction here for the maximum current, recourse is made to a definition that is close to that of the firing angle α in the conventional method. Instead however of defining a fixed firing angle α, as in the conventional method, now, as already explained in connection with FIG. 8, the firing angle region 11 is fixed by a minimum firing angle $\alpha_{min}$ and a maximum firing angle $\alpha_{max}$, which are in a fixed angular relationship with the voltage vector $\vec{U}_1^S$ and rotate with it by the angular velocity $\omega_U = 2\pi f_{grid}$, which is directly proportional to the grid frequency $f_{grid}$, see FIG. 12. To illustrate this: in FIG. 12, the firing possibilities would be those of which the paths lie in the firing angle region 11, i.e. only the firing that corresponds to the path $i_b = -i_c$, i.e. the firing of phases b and c.

Since the region of the allowed firings has been restricted to the firing angle region 11 delimited by the minimum and maximum firing angles αmin and αmax, the torque region is also to be restricted. If the aim is to accelerate the motor, all firing possibilities in the first region 8 are attractive, because they generate a positive torque, and all possibilities in the second region 9 are unattractive, because they generate a negative torque.

Apart from the criterion of the torque, it must also be ensured during the operation of the three-phase machine that there is still sufficient flux in the motor after a firing. If for example a firing were to take place for a current vector along the path $i_s = -i_c$ in FIG. 11, a positive torque would be generated, since this firing is in the half-space 8 in which the positive torque +$M_M$ can be generated. However, the current vector $\vec{I}_1^S$ pulsating along the path $i_a = -i_c$ would then be oriented largely oppositely to the flux vector $\vec{\Psi}_2^S$, and would therefore lead to a significant reduction in the flux in the rotor. This observation is, for the sake of simplicity, based on a single specific firing; in fact, it is the overlaying of a number of individual firings that statistically leads to a reduction in the flux.

Figure 14:
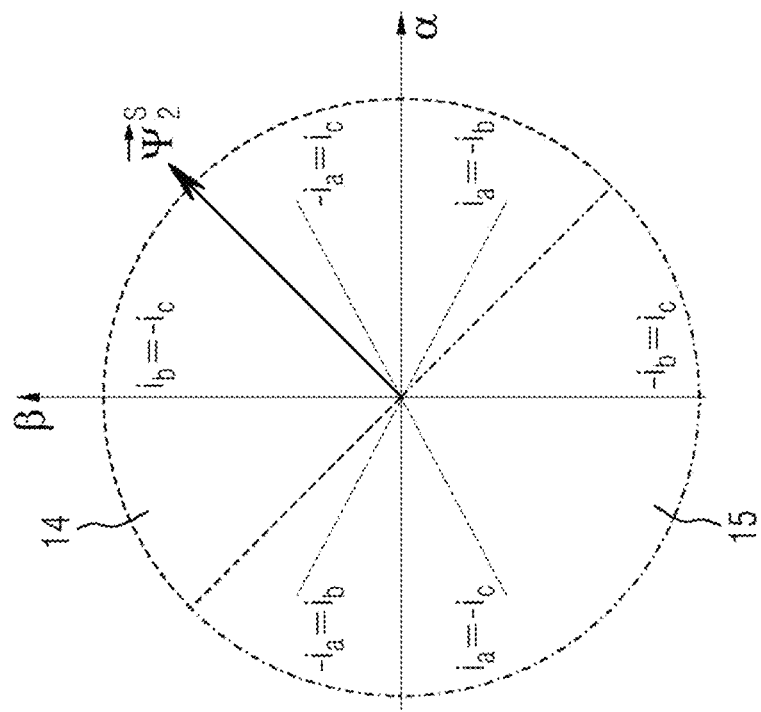
FIG. 14 shows a space vector diagram with a rotor flux vector, a voltage vector and regions which strengthen or weaken the rotor flux linkage.

While ignoring rotor resistance R2 and core losses, FIG. 14 shows where flux is built up and where it would be reduced: there is a region 14, surrounded by dashed lines, in which those firing possibilities that strengthen the rotor flux linkage lie, and a region 15, surrounded by dash-dotted lines, in which those firing possibilities that weaken the rotor flux linkage lie.

Figure 10:
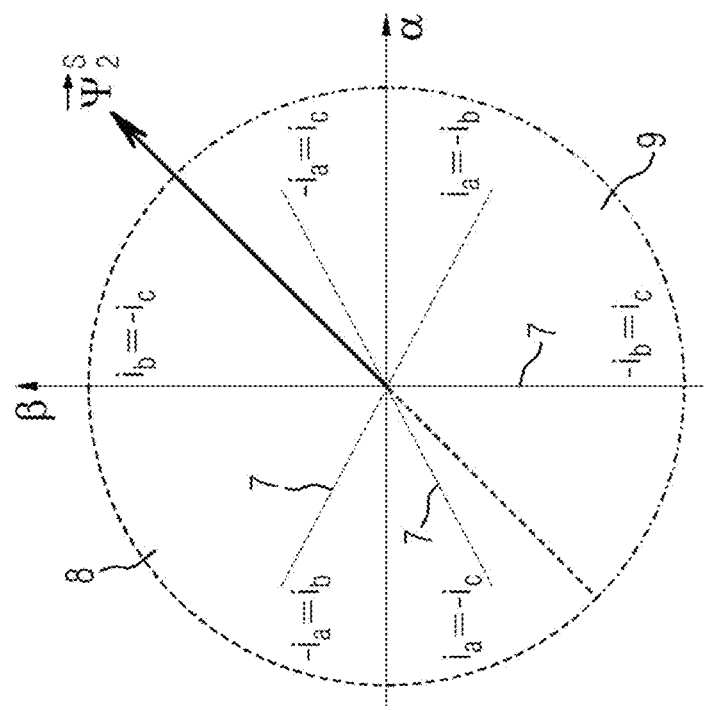
FIG. 10 shows a space vector diagram with a rotor flux vector and regions with a positive torque and a negative torque.
Figure 13:
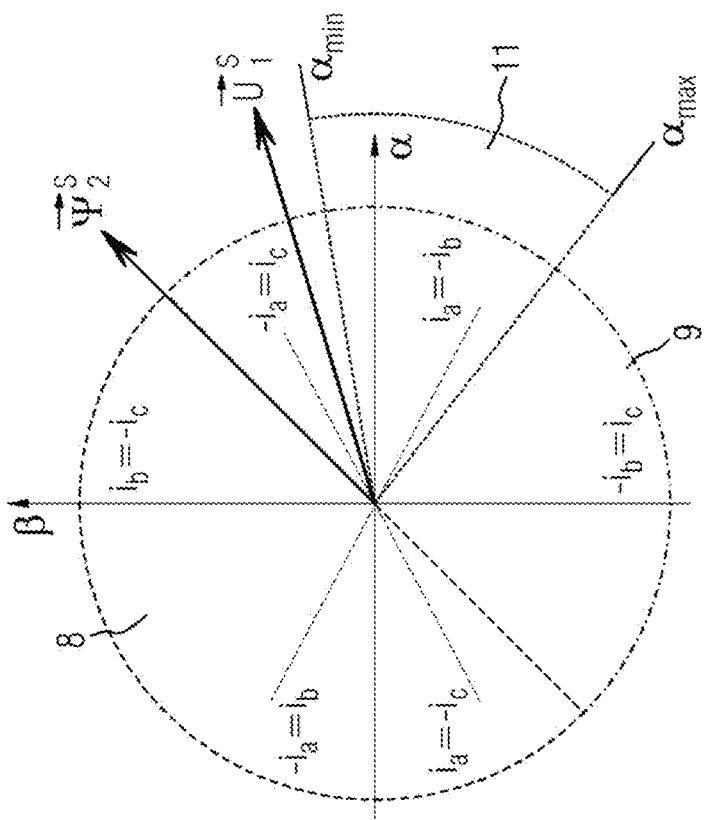
FIG. 13 shows a space vector diagram with a rotor flux vector, a voltage vector and a firing window.
Figure 15:
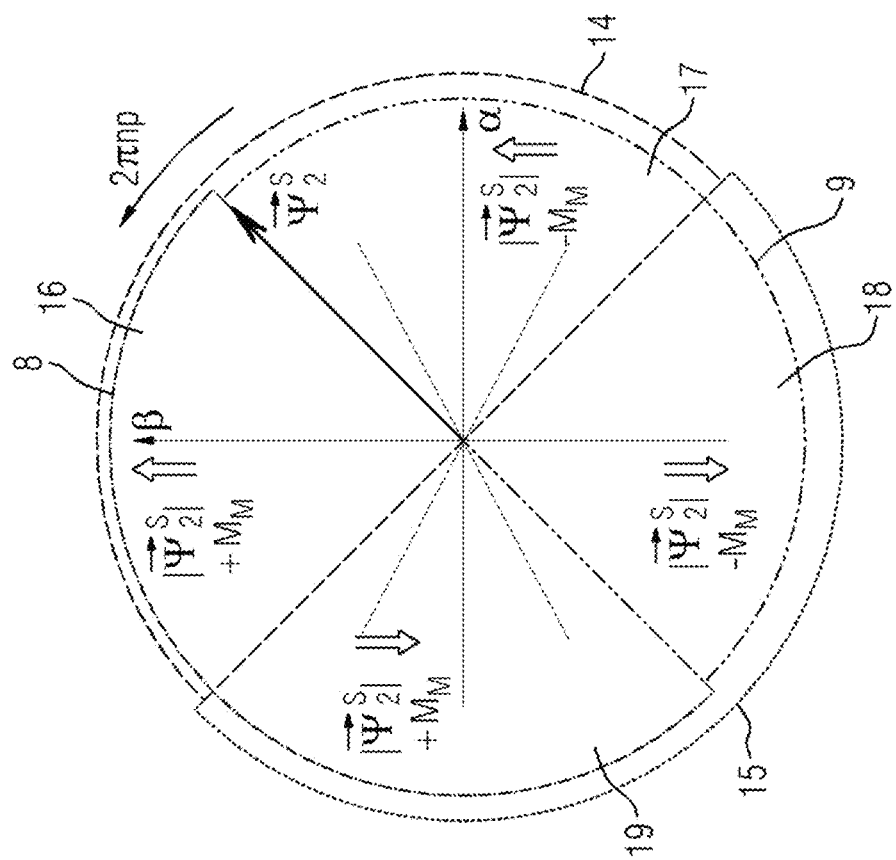
FIG. 15 shows a space vector diagram which compiles the information from FIG. 10 and FIG. 14 in one representation.

FIG. 15 compiles the information from FIG. 10 and FIG. 14 in one representation: the regions 8 and 9, in which respectively positive torque +$M_M$ and negative torque −$M_M$ is generated, and the regions 14 and 15, in which respectively flux is built up $\vec{\Psi}_2^S \Uparrow$ and flux is reduced $\vec{\Psi}_2^S \Downarrow$, overlap one another and lead to the four different sectors 16 to 19 that are represented. The regions 8, 9, 14, 15, 16, 17, 18 and 19 depicted in FIG. 15 are in a fixed angular relationship with the rotor flux vector $\vec{\Psi}_2^S$ and rotate with it by the angular velocity $\omega_\Psi = 2\pi np$, which is directly proportional to the mechanical rotor speed n and to the number of pairs of poles p of the three-phase cage motor.

Figure 16:
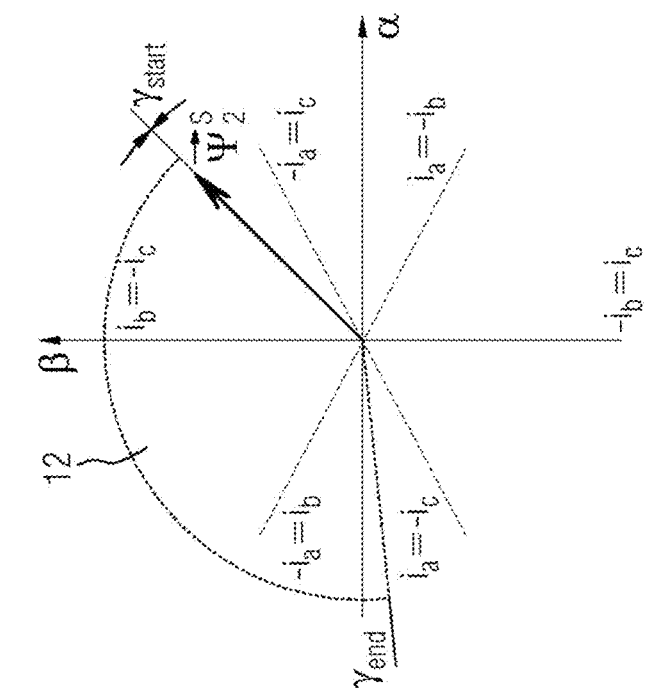
FIG. 16 shows a space vector diagram with a rotor flux vector and a flux window.

If an acceleration of the motor is the aim of the soft starter, the chosen current vector should lie in the sectors with a positive torque, i.e. in the sectors 16 and 19. Because of the constant decrease in rotor flux on account of the rotor resistance $R_2$, it is useful if on average more flux is generated by the firings than is lost. FIG. 16 shows a flux and torque angle region 12, also referred to for the sake of simplicity as a flux window, which takes this behavior into account: the flux and torque angle region 12, which relates to the rotor flux vector $\vec{\Psi}_2^S$, is delimited by the angles $\gamma_{start}$ and $\gamma_{end}$, which are measured from the rotor flux vector $\vec{\Psi}_2^S$. The flux and torque angle region 12 was fixed for example on the basis of the relationships in FIG. 15, together with the prescription that, seen statistically, on average the firings are to generate more flux than is lost.

Figure 17:
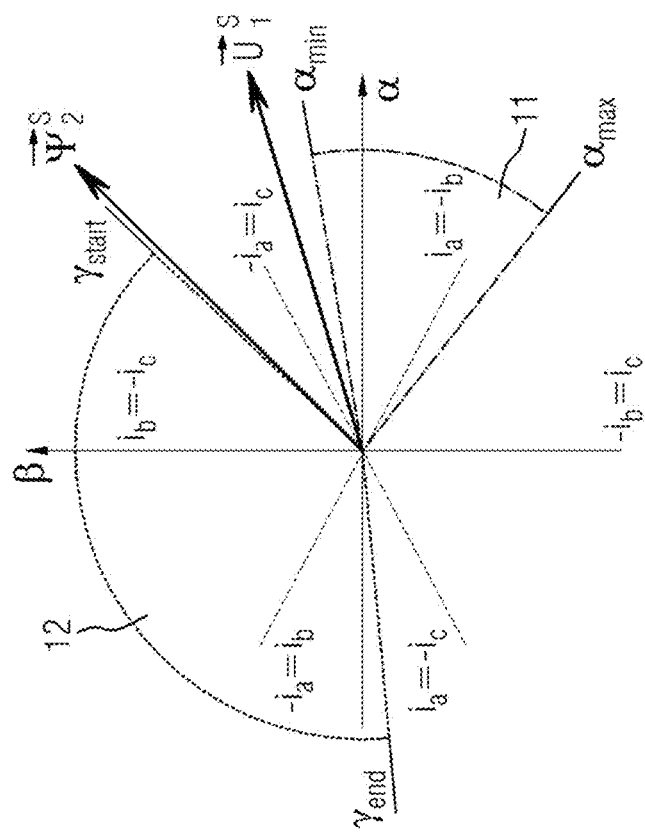
FIG. 17 shows a space vector diagram with a rotor flux vector, a firing window and a flux window.
Figure 18:
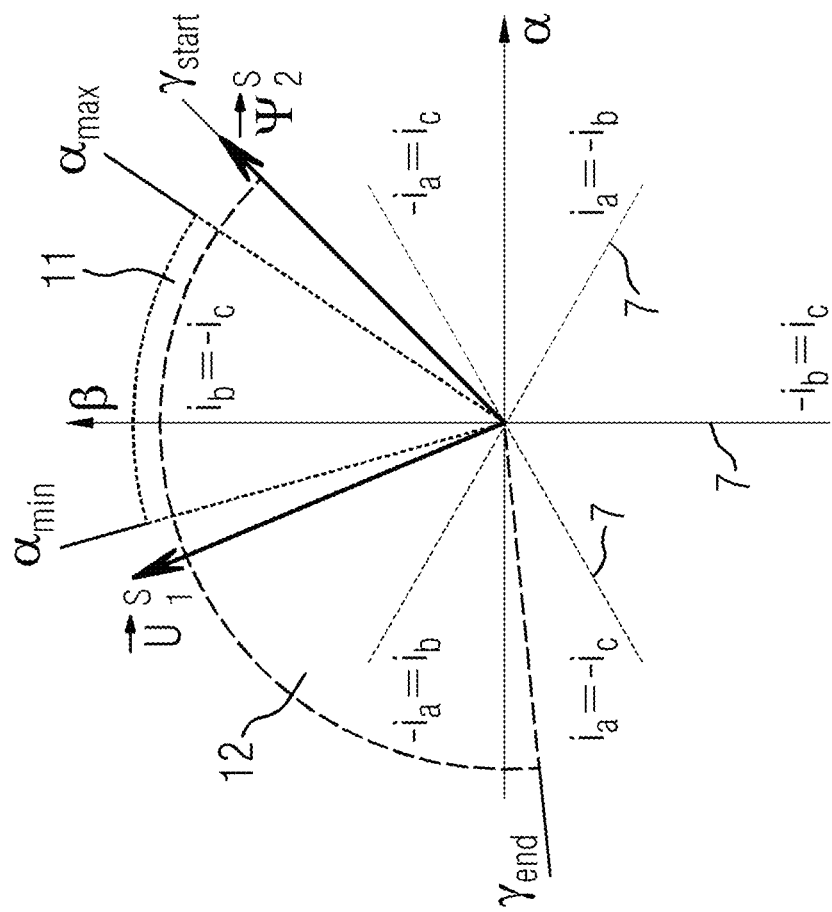
FIG. 18 shows a space vector diagram with a rotor flux vector, a voltage vector, a firing window and a flux window.
Figure 21:
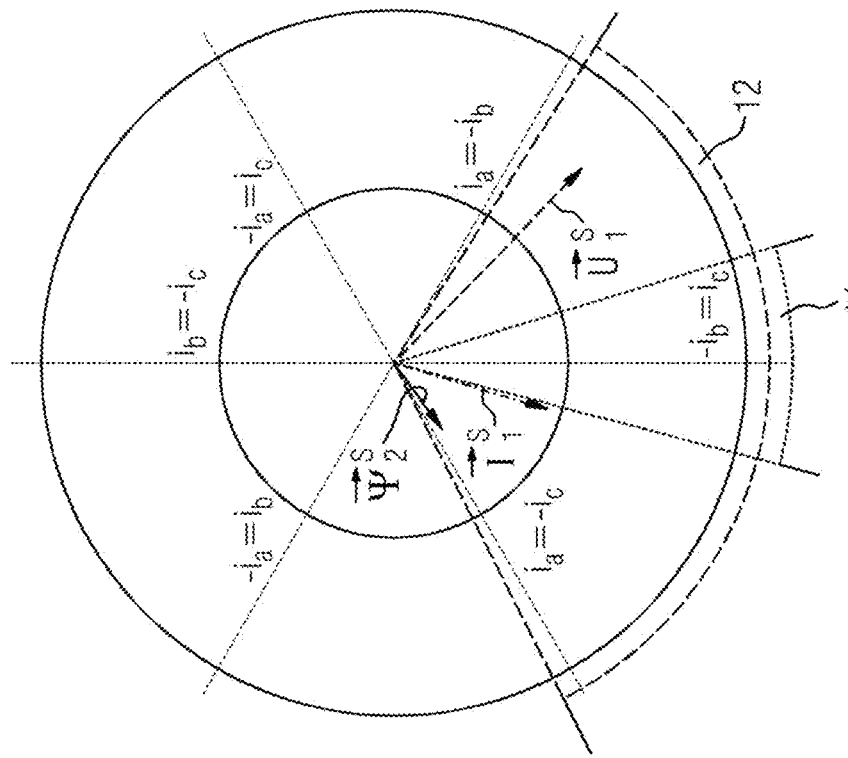
Figure 22:
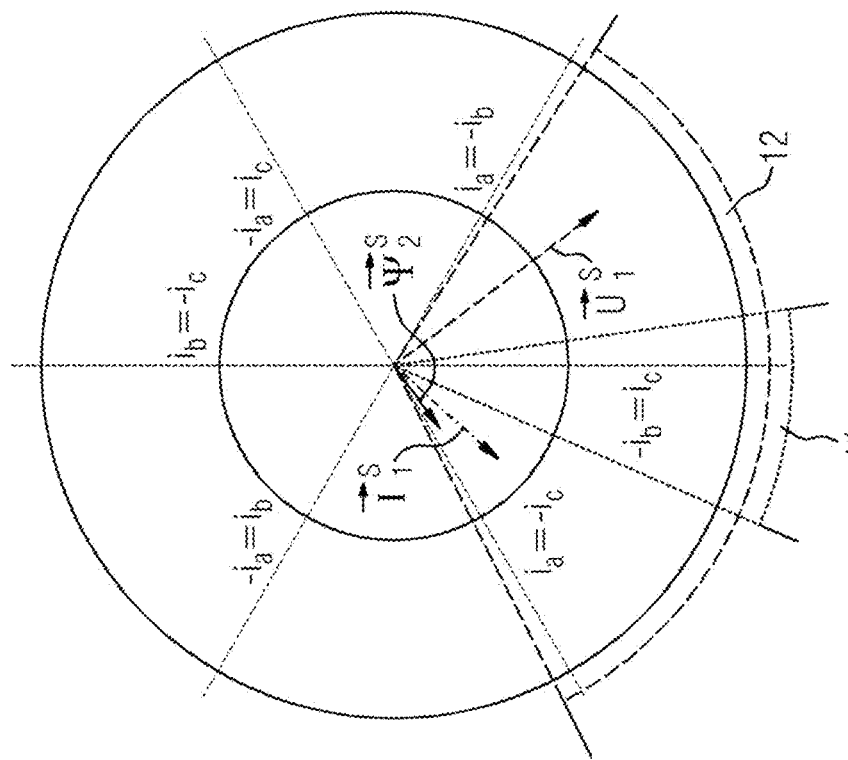

The flux and torque angle region 12 thus defined therefore includes sectors with a positive torque and sectors with a flux build-up or only little flux reduction. The two defined regions, the firing angle region 11 and the flux and torque angle region 12, are thus intended to be combined into one decision criterion. If therefore there is a firing possibility 7 both within the firing angle region 11 and within the flux and torque angle region 12, this firing should be performed. In the example shown in FIG. 17, this is not the case for any of the firing possibilities; accordingly, no firing should be performed. Thus, a certain time may be allowed to pass, in which time the voltage vector $\vec{U}_1^S$ rotates further. For example, about 5 ms later, which in the case of a 50 Hz alternating voltage with an angular frequency of $\omega = 2\pi/(20$ ms) corresponds to a 90° rotation in the space vector diagram, the setup looks like in FIG. 18: the voltage vector $\vec{U}_1^S$ has rotated further by 90°, the rotor flux vector $\vec{\Psi}_2^S$ on the other hand remains constant in its amplitude and direction (the motor is at a standstill, no core or rotor losses). Now, the path 7 of the firing combination b&c lies both in the sector 11 and in the sector 12. Therefore, this firing combination b&c can be performed in order to generate a positive torque +$M_M$, increase the rotor flux $\Psi_2^S$ to some extent and not exceed a maximum current amplitude.

The method represented here can thus be performed repeatedly at fixed intervals. Whenever one of the firing combinations a&b, b&c, c&a lies within the two sectors 11 and 12, it is fired. Consequently, a simple criteria check is sufficient to generate the control pulses.

Figure 23:
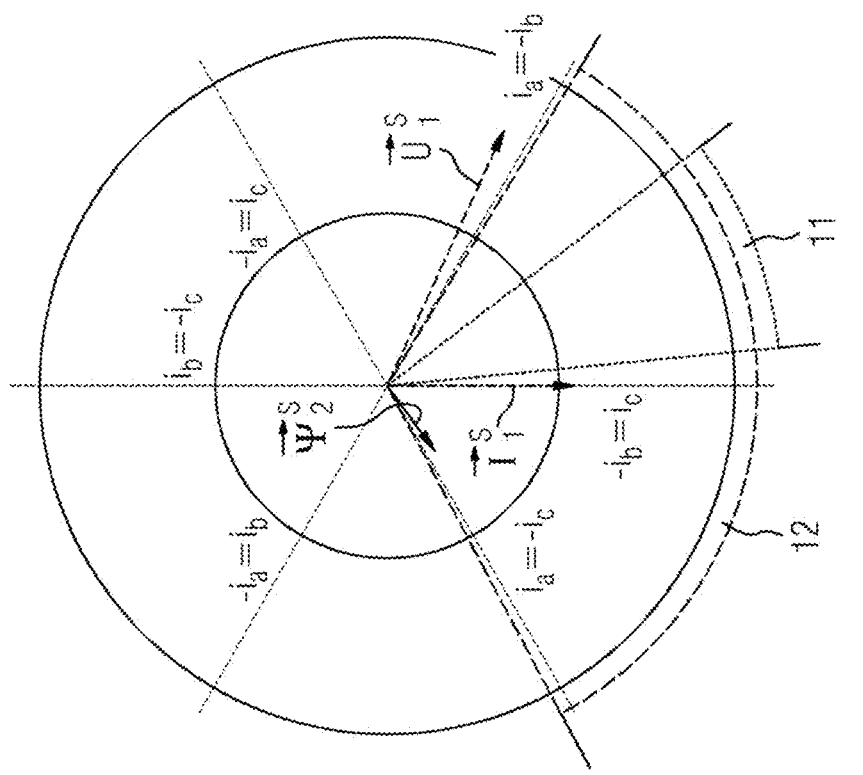
Figure 24:
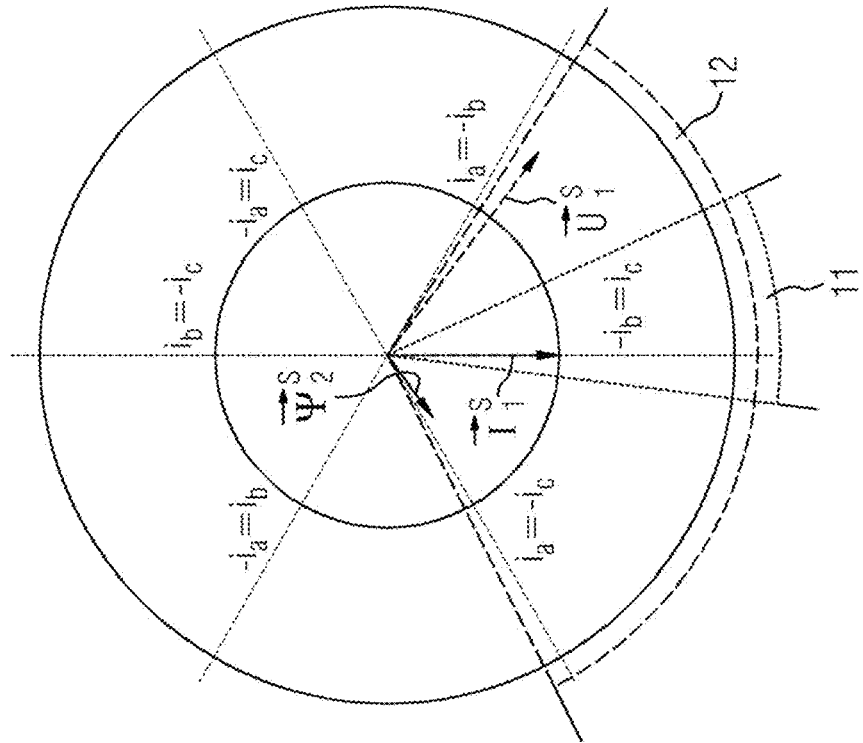
Figure 25:
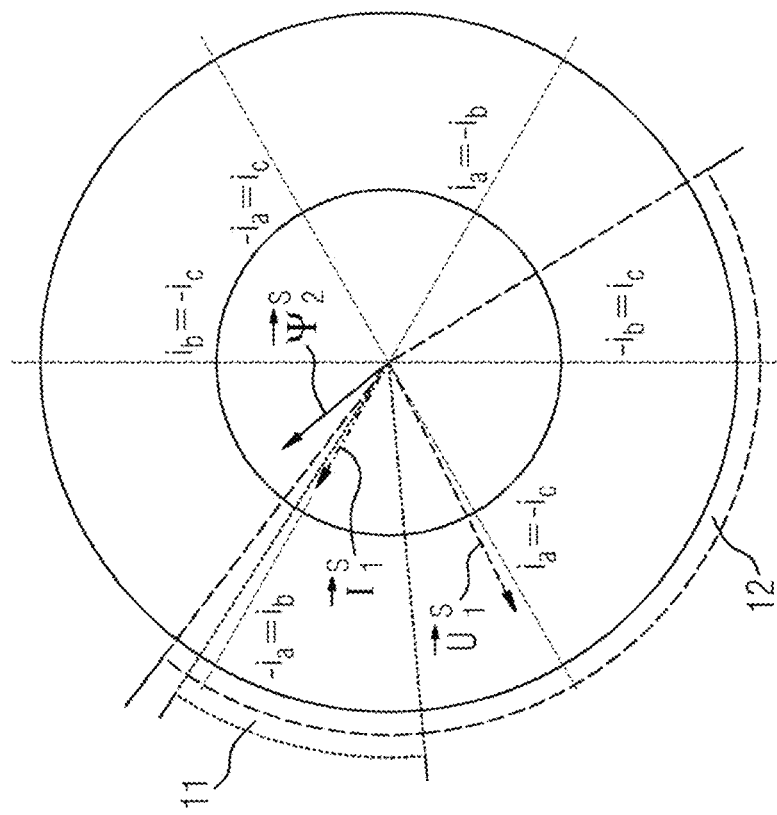
FIGS. 25 to 28 show a time series of a space vector diagram over a time period of 6 ms with a rotor flux vector, a voltage vector and a rotating stator current vector in the case of a rotating rotor.
Figure 26:
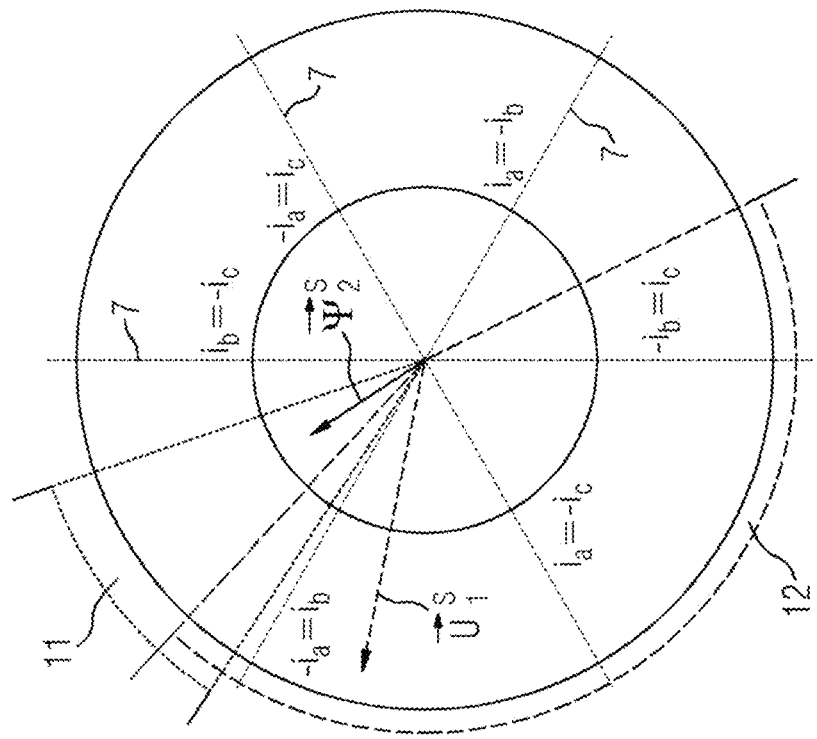
Figure 27:
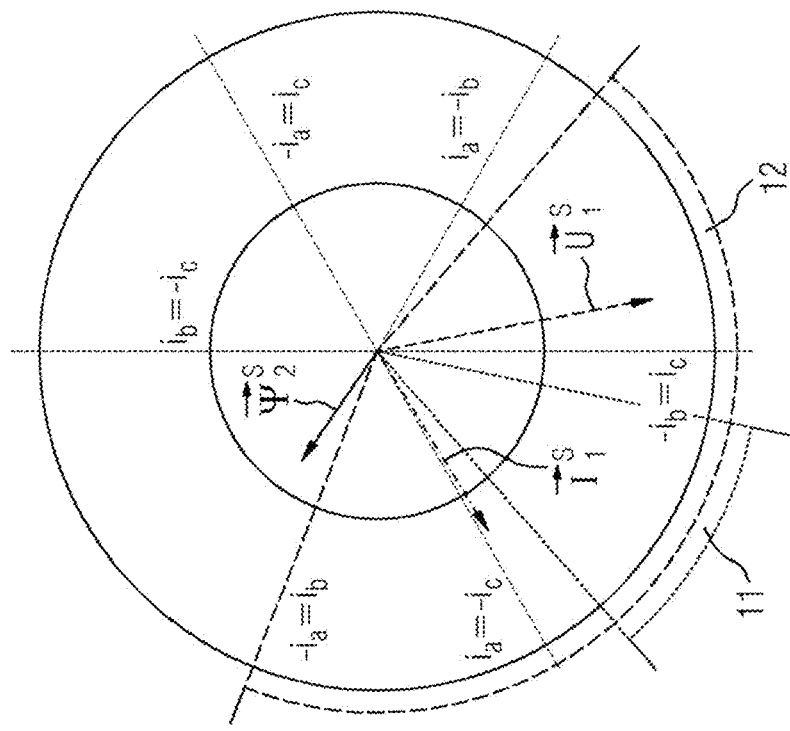
Figure 28:
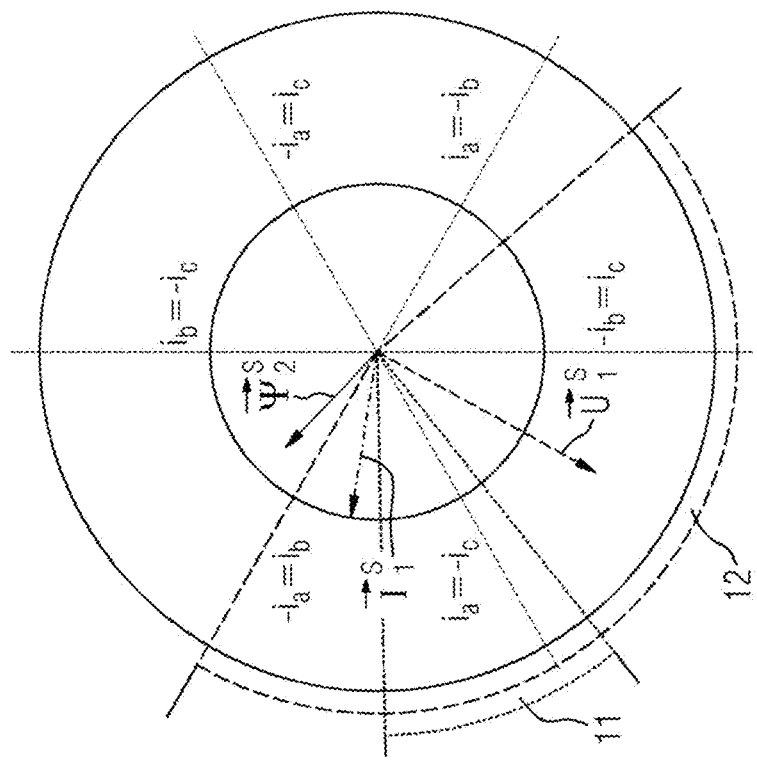
Figure 29:
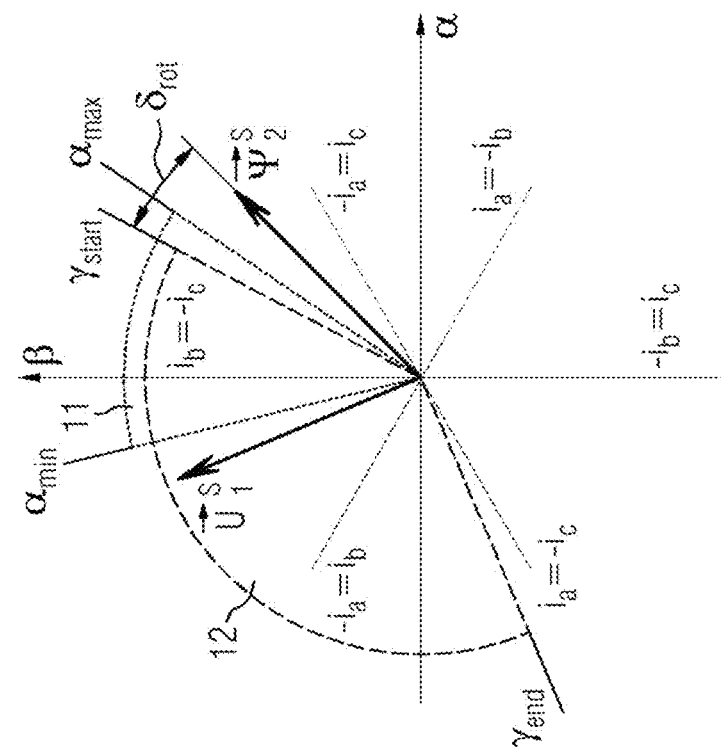
FIG. 29 shows a space vector diagram with a rotor flux vector, a voltage vector, a firing window and a flux window.

When a firing has taken place, it may happen that a further firing possibility, in which the third, still blocking pair of thyristors is involved, arises while current is still flowing. In this case, this firing would also be performed immediately. Accordingly, there would be a three-phase firing a&b&c, which, by contrast with the two-phase firings, produces a rotating current vector $\vec{I}_1^S$. This situation of a 3-phase firing is illustrated in FIGS. 19 to 24. FIG. 23, at t=3.4 ms, and FIG. 24, at t=3.9 ms, show that, when the current vector $\vec{I}_1^S$ passes the next firing possibility during the movement, it then "locks onto" this position. If the associated phase currents are considered, this is the point at which the thyristor in one of the phases blocks as a result of a current zero crossing.

Rotating Motor

All of the observations made so far are based on the simplifying assumption that the rotor is at a standstill. However, this assumption is no longer tenable after the first firings, as soon as the rotor has started moving. Therefore, the speed of the motor must then be taken into account in the considerations. The fixed paths 7 of the current vector, see the α-β diagram in FIG. 5, are uninfluenced by the speed, since they are solely dependent on the stator, which does not rotate. The fundamental relationships of the firing angles also do not change. However, while the current is flowing, the position of the rotor flux vector $\vec{\Psi}_2^S$ and the stator current vector $\vec{I}_1^S$ changes in the space vector representation. To be more precise: not only the position of the space vectors $\vec{\Psi}_2^S$ and $\vec{I}_1^S$ changes, but also the angular position of these two space vectors in relation to one another changes. This deviation leads to a deviation in the assessment of the torque to be expected and the influence on the rotor flux. These are illustrated by way of example in FIGS. 25 to 28.

FIGS. 25 to 28 apply to a firing for a rotor rotating at a mechanical speed of n=250 rpm (rated speed 1470 rpm). The voltage vector $\vec{U}_1^S$ rotates with an angular velocity $\omega_U = 2\pi f_{grid}$ directly proportional to the grid frequency $f_{grid}$, the flux vector $\vec{\Psi}_2^S$ with an angular velocity $\omega_\Psi = 2\pi n p$ directly proportional to the number of pairs of poles p and the mechanical rotor speed n, these two angular velocities not coinciding; on the other hand, the current vector axes 7, the so-called paths, for the 2-phase firings point in fixed directions. It can be seen in FIGS. 25 to 28 that, on account of the rotation of the rotor, not only the voltage vector $\vec{U}_1^S$ but also the flux vector $\vec{\Psi}_2^S$ rotates. Correspondingly, the fixed relationship with the current vector $\vec{I}_1^S$ at the beginning of the firing does not apply any longer over the entire time of the current flow, but changes over time. This has the effect that the considerations concerning the positive torque and the rotor flux development are founded on a different basis than they actually occur during the firing. In order to compensate for this effect, the originally fixed region for possible firings is rotated by an angle of rotation $\delta_{rot}$. This rotation has the purpose of compensating in the best possible way for the deviation due to the rotating rotor.

Figure 30:
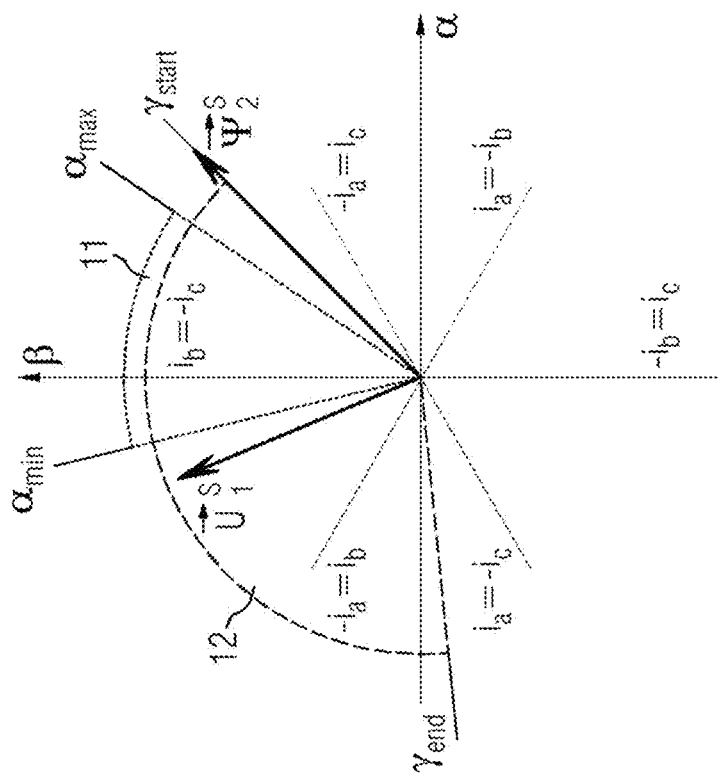
FIG. 30 shows a space vector diagram with a rotor flux vector, a voltage vector, a firing window and a flux window which has been rotated with respect to the flux window in FIG. 29 by an angle of rotation $\delta_{rot}$.

A determination of the angle of rotation $\delta_{rot}$ could look as follows, other systematic determinations also being conceivable: on the assumption that the conditions on average over time of a current pulse approximately represent the average value of the relationships over the entire current pulse, this can be used as a reference. Now the last current pulse is taken as a basis and the time interval $t_{delay}$ between the firing instant and the current maximum is determined, as illustrated in FIG. 30. It can then be assumed with good approximation that the time interval $t_{delay}$ in the case then to be assessed is identical to that of the preceding firing pulse. To put it another way: if at the preceding firing pulse the time interval between the firing and the current maximum is equal to $t_{delay}$, it will no doubt be very similar or identical at the next firing pulse. Correspondingly, the flux and torque angle region 12 may be pre-rotated by an angle of rotation $\delta_{rot}$ corresponding to the time interval $t_{delay}$ as shown in FIG. 30, in order to minimize the influence of the rotating rotor on the firing decision.

With the following equation (6), the angle of rotation $\delta_{rot}$ can be determined under this assumption, where $\Omega_L$ is the rotor speed:

$$\delta_{rot} = 2\pi \left( \frac{t_{delay}}{1/\Omega_L} \right) = 2\pi \, \Omega_L \, t_{delay} \quad (6)$$

If the angle of rotation $\delta_{rot}$ is determined in the way described, it is possible to compensate for a large part of the changes occurring due to the rotating rotor.

Influencing the Behavior by Influencing the Position of the Switching Limits

Figure 32:
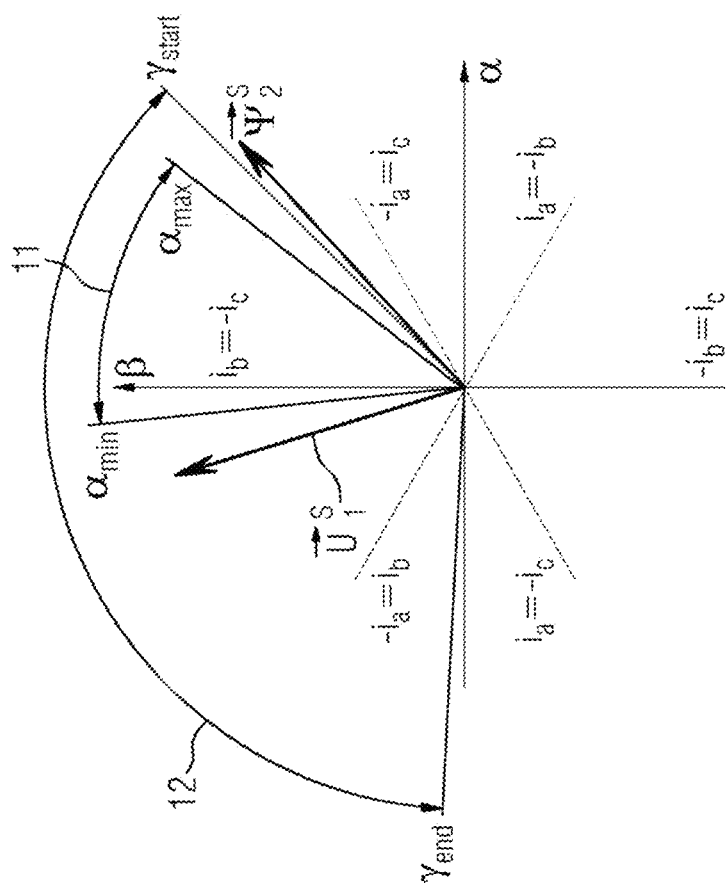
FIG. 32 shows a space vector diagram with a rotor flux vector and a voltage vector which represents the limits of the firing angle region and the rotor flux angle region.
Figure 31:
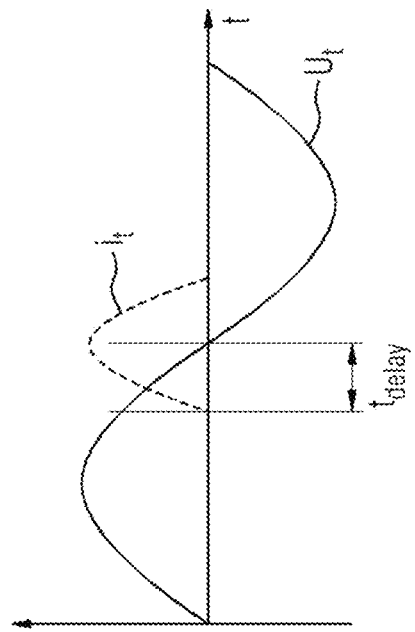
FIG. 31 shows a representation of the definition of $t_{delay}$.

So far, the statements made in relation to fixing the two firing regions have been very vague and substantiated by considerations of a fundamental nature in order to explain the underlying thought process. In the specific application, on the other hand, there is a need for systematics, to fix these values such that the actual operating behavior coincides as far as possible with the desired operating behavior. For this, the limits must be systematically determined. In FIG. 32, the limits $\alpha_{min}$, $\alpha_{max}$, $\gamma_{start}$, $\gamma_{end}$ are represented, the influence of which on the method is systematically explained below.

Upper Firing Angle Region Limit $\alpha_{max}$:

This limit is of decisive importance; it indirectly defines the shortest current flow through the firing. This angle αmax should be chosen such that, in the case of a grid in which it is difficult to determine where the current crosses zero (high harmonic loading or distortions in the region before and after the zero crossing), it is ensured that the firing always behaves in such a way that the current flows in the desired direction and there is no unwanted firing with a current amplitude that is much too high.

Lower Firing Angle Region Limit $\alpha_{min}$:

This limit determines the firing with which the current flow reaches the maximum length and greatest amplitude. This angle $\alpha_{min}$ may be prescribed in a way analogous to the firing angle $\alpha$ in the case of the classic control methods, for example by way of a characteristic curve, or be controlled in a closed-loop manner while taking into account the current amplitude. It is also conceivable to take into account the flux amplitude at the time for limiting the maximum possible torque. Since the current and the torque can be controlled via the angle $\alpha_{min}$, the function of this angle is similar to that of the firing angle $\alpha$ in conventional control methods. $\alpha_{min}$ may assume a value from the following definition region: [−90°; $\alpha_{max}$], measured in relation to the voltage vector $\vec{U}_1^S$.

Limit with Respect to Negative Torque $\gamma_{start}$:

This limit determines the limitation with respect to the negative torque. Depending on the choice of the angle $\gamma_{start}$, for example a slightly negative torque is allowed, in favor of a strongly flux-forming current.

Flux Control Limit $\gamma_{end}$:

This angle $\gamma_{end}$ determines how long the firings are continued in order to generate a positive torque $+M_M$. Depending on how this limit is fixed, either firing is performed for a long time, and as a result the rotor flux linkage is reduced, or firing is only performed if on average there is no reduction in the rotor flux linkage. Fixing the angle $\gamma_{end}$ in this way therefore actively determines how much rotor flux linkage remains in the rotor and is present at the next firing phase. This parameter may be used for "flux guidance" or "flux control" during running-up. Via the angle $\gamma_{end}$, therefore, the average absolute rotor flux $|\vec{\Psi}_2^S|$ can be influenced. If the motor is to be accelerated, the difference $\gamma_{end} - \gamma_{start}$ can assume a value from the following definition region: [90°, 180°], measured in relation to the flux vector $\vec{\Psi}_2^S$.

Example Control Structure for Influencing the Switching Limits

As already explained in the previous section "Influencing the behavior by influencing the position of the switching limits", the angles $\alpha_{min}$, $\alpha_{max}$, $\gamma_{start}$, $\gamma_{end}$, which delimit the firing window or flux window, can be used for influencing running-up.

With at least one embodiment of the invention, closed-loop controlled operation is also possible. The representation of the above relationships given so far is based on the assumption that an acceleration of the rotor shaft is the aim; the generation of a positive torque is required for this. The same arguments can also be transferred to the case of braking, only that here the window of possible firings is arranged in the region for negative torques.

Transfer Between Methods—Combination with Conventional Methods

The method presented here offers advantages over conventional control methods based only on a firing angle $\alpha$, but presumably also some disadvantages. Therefore, as an alternative to exclusive use for determining control signals, at least one embodiment of the invention may also be used as a supplement to the existing methods. It is possible that the present method is better suited for specific speed ranges than for others. It is accordingly also possible that, during running-up, the novel method presented here and a known method are combined. In a preferred configuration, the start could begin at first with the novel method; subsequently, during running-up, it is decided on the basis of a quality criterion, for example the speed, that a switchover to conventional control is made, in order to combine the advantages of the two methods.

Rotor Flux as a Basis

The basis for all of the assessments made is the use of the linked rotor flux $\vec{\Psi}_2^S$. By contrast with the stator current, the linked rotor flux $\vec{\Psi}_2^S$ cannot however be directly measured in an industrial environment by way of corresponding sensor systems. The simplest possibility for determining the rotor flux linkage is to use the modeling already introduced above (cf. equation (16) in Nannen et al.):

$$\frac{d\vec{\Psi}_2^S}{dt} = \frac{R_2 \cdot L_h}{L_2} \cdot \vec{I}_1^S - \frac{R_2}{L_2} \cdot \vec{\Psi}_2^S + j \cdot \Omega_L \cdot \vec{\Psi}_2^S \qquad (8)$$

The stator current $\vec{I}_1^S$ and the rotor speed $\Omega_L$ are required for this. The stator current $\vec{I}_1^S$ can be easily measured: the two or three phase currents are measured, and then the current vector $\vec{I}_1^S$ is calculated via Clarke transformation. The mechanical speed may in principle also be recorded by way of suitable measuring instruments. However, this is not typical when using soft starters in the industrial environment, since the costs and the effort involved in installation make soft starters uneconomical to use. Accordingly, a determination of the speed without an additional sensor appears to be very advantageous. There are many possibilities for the model-based determination of the speed, developed in recent decades in view of the sensorless closed-loop control of three-phase machines. The following monograph offers an overview of this: Vas, Peter: Sensorless Vector and Direct Torque Control. Monographs in Electrical and Electronic Engineering, Volume 42. Oxford: Oxford University Press 1998, ISBN-13: 978-0198564652, the entire contents of which are hereby incorporated herein by reference. An alternative modeling of the rotor flux is also possible.

Figure 33:
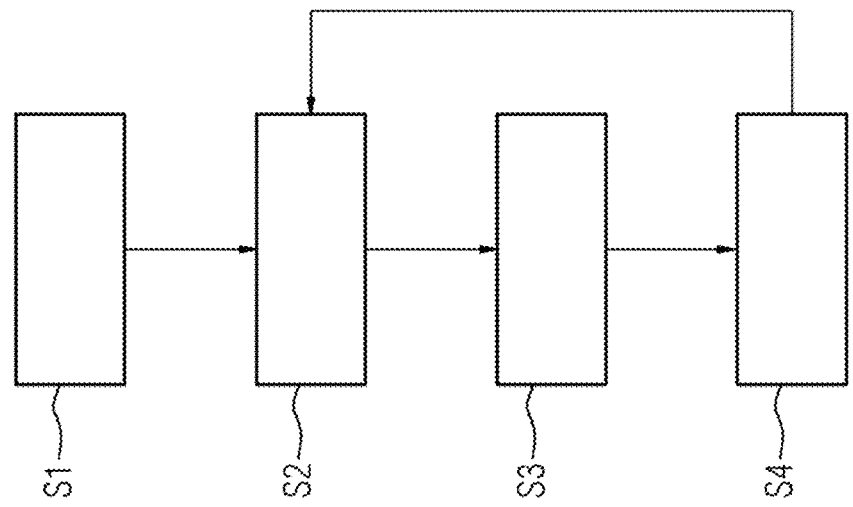
FIG. 33 shows a flow diagram according to one embodiment of the method according to the invention.

FIG. 33 shows a flow diagram according to one embodiment of the method according to the invention. In a first step S1, the grid-related firing criterion and the rotor-related firing criterion are defined. The grid-related firing criterion is satisfied if a firing possibility lies within the firing angle region 11, which is delimited by a lower firing angle region limit $\alpha_{min}$ and an upper firing angle region limit $\alpha_{max}$ in relation to the voltage vector $\vec{U}_1^S$. The rotor-related firing criterion is satisfied if a firing possibility lies within the flux and torque angle region 12, the range limit values $\gamma_{start}$ and $\gamma_{end}$ of which are defined in relation to the rotor flux. In the first step S1, firings of thyristors are also performed in order to set the rotor in rotation, and so the rotor flux is unequal to zero.

In a second step S2, following the first step S1, it is checked whether the grid-related firing criterion is satisfied. The grid-related firing criterion is satisfied if a firing possibility of two or more grid phases a, b, c lies within the firing angle region 11.

In a third step S3, following the second step S2, it is checked whether the rotor-flux-related firing criterion is satisfied. The rotor-flux-related firing criterion is satisfied if a firing possibility of two or more grid phases a, b, c lies within the flux and torque angle region 12.

In a fourth step S4, following the third step S3, a firing possibility of two or more grid phases a, b, c provides a trigger for a firing of the corresponding thyristors if both the grid-related firing criterion and the rotor-flux-related firing criterion are satisfied. After the fourth step S4, a return is made to the second step S2, from where the repeated run-through of steps S2 to S4 begins again.

Soft Starter Topology

The basis for all of the observations made is the topology shown in FIG. 1. In principle, an application of the method is also conceivable for any other thyristor-based topology.

Figure 34:
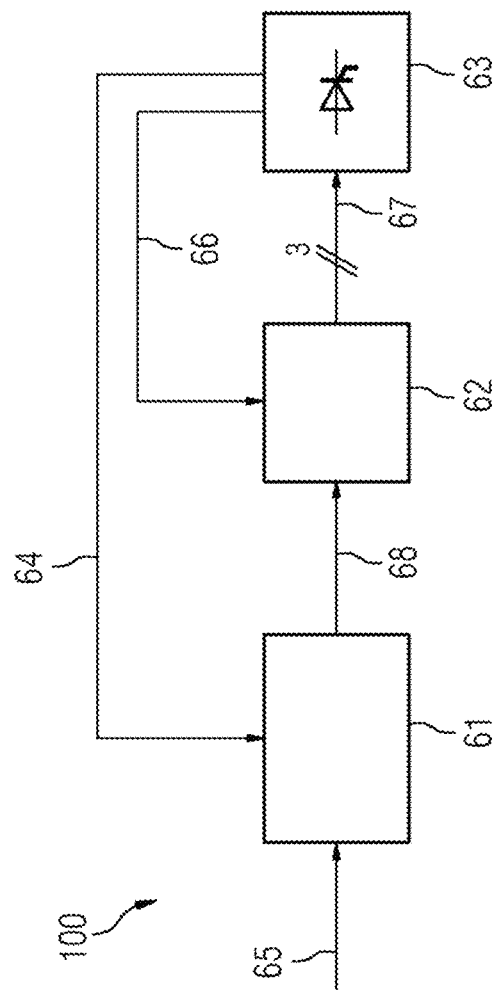
FIG. 34 shows a structure for generating control pulses according to an embodiment of the invention.

A possible structure for generating control pulses according to the present invention is shown in FIG. 34: in a first block of the soft starter 100, a control unit 61 receives setpoint values 65, for example a desired motor torque, a maximum setpoint current or a speed ramp, and measured values 64, for example the stator current $I_1$, the stator voltage $U_1$, the torque M and/or the rotor speed n of the motor. On the basis of the received setpoint values 65 and the received measured values 64, the control unit 61 sets one or more of the manipulated variables 68, i.e. $\alpha_{min}, \alpha_{max}, \gamma_{start}, \gamma_{end}$, such that the setpoint values can be achieved. These manipulated variables 68 are transferred to a second block of the soft starter 100, a computing unit 62, which has a processor and a storing unit. The processor executes a computer program which is stored in the storing unit and contains an algorithm for performing the method according to the invention. The computing unit 62 generates control signals 67 from the manipulated variables 68 obtained.

A third block 63 of the soft starter 100 comprises thyristors and firing devices, for example a firing signal unit. The control signals 67 received from the computing unit 62 cause the firing signal unit to generate firing signals for one or more of the thyristors, and so the thyristor or thyristors are switched on.

Of course, the embodiments of the method according to the invention and the imaging apparatus according to the invention described here should be understood as being example. Therefore, individual embodiments may be expanded by features of other embodiments. In particular, the sequence of the method steps of the method according to the invention should be understood as being example. The individual steps can also be performed in a different order or overlap partially or completely in terms of time.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for operating a three-phase cage motor on a multiphase electrical grid via a soft starter, including one or more grid phases of the grid being respectively switchable by firing thyristors, and apart from a grid-related firing criterion, a rotor-flux-related firing criterion is taken into account, both the grid-related firing criterion and the rotor-flux-related firing criterion being required to be satisfied for a firing decision for a firing possibility of one or more thyristors, the firing either being on a 2-phase basis or on a 3-phase basis with a 2-phase firing leading to a current vector fixed in alignment and pulsating in amplitude and a 3-phase firing leading to a rotating current vector in a space vector representation, the method comprising:
    satisfying the grid-related firing criterion upon, in a space vector representation, the current vector of a firing possibility of two or more grid phases lying within a firing angle region defined by a lower firing angle region limit and an upper firing angle region limit in relation to at least one of a grid voltage of the grid and a grid current of the grid; and
    satisfying the rotor-flux-related firing criterion upon, in a space vector representation, the current vector of a firing possibility of two or more grid phases lying within a flux and torque angle region of which region limit values are defined in relation to the rotor flux.

2. The method of claim 1, further comprising:
    checking for existence of at least one of the grid-related firing criterion and the rotor-flux-related firing criterion based upon a space vector representation of rotor flux, grid voltage and stator current.

3. The method of claim 1, wherein the flux and torque angle region is displaced by an angle of rotation to compensate for a time delay between a firing decision and the firing.

4. The method of claim 1, wherein the three-phase cage motor is an asynchronous motor, a synchronous motor or a line-start PM motor.

5. The method of claim 1, wherein checking of at least one of the grid-related firing criterion and rotor-flux-related firing criterion is preceded by a time phase of flux build-up, in which rotor flux is generated by firings of thyristors.

6. The method of claim 1, wherein only firing possibilities resulting in negative torques, and actively brake the three-phase cage motor, are determined.

7. A soft starter for operating a three-phase cage motor on a multiphase electrical grid, including one or more grid phases of the grid being respectively switchable by firing thyristors, and apart from a grid-related firing criterion, a rotor-flux-related firing criterion is taken into account, both the grid-related firing criterion and the rotor-flux-related firing criterion being required to be satisfied for a firing decision for a firing possibility of one or more thyristors, the firing either being on a 2-phase basis or on a 3-phase basis with a 2-phase firing leading to a current vector fixed in alignment and pulsating in amplitude and a 3-phase firing leading to a rotating current vector in a space vector representation, the soft starter comprising:
    at least one electronic circuit configured to check for:
        satisfying the grid-related firing criterion upon, in a space vector representation, the current vector of a firing possibility of two or more grid phases lying within a firing angle region defined by a lower firing angle region limit and an upper firing angle region limit in relation to at least one of a grid voltage of the grid and a grid current of the grid; and
        satisfying the rotor-flux-related firing criterion upon, in a space vector representation, the current vector of a firing possibility of two or more grid phases lying within a flux and torque angle region of which region limit values are defined in relation to the rotor flux.

8. A non-transitory computer program product, storing commands which, when executed by a soft starter, configure the soft starter to perform the method of claim 1.

9. A non-transitory computer-readable medium storing a computer program which, when executed by a soft starter, configure the soft starter to perform the method of claim 1.

10. The method of claim 2, wherein the flux and torque angle region is displaced by an angle of rotation to compensate for a time delay between a firing decision and the firing.

11. The method of claim 2, wherein the three-phase cage motor is an asynchronous motor, a synchronous motor or a line-start PM motor.

12. The method of claim 2, wherein the checking for existence of at least one of the grid-related firing criterion and rotor-flux-related firing criterion is preceded by a time phase of flux build-up, in which rotor flux is generated by firings of thyristors.

13. The method of claim 2, wherein only firing possibilities resulting in negative torques, and actively brake the three-phase cage motor, are determined.

14. The method of claim 3, wherein the three-phase cage motor is an asynchronous motor, a synchronous motor or a line-start PM motor.

15. The method of claim 3, wherein checking of at least one of the grid-related firing criterion and rotor-flux-related firing criterion is preceded by a time phase of flux build-up, in which rotor flux is generated by firings of thyristors.

16. The method of claim 3, wherein only firing possibilities resulting in negative torques, and actively brake the three-phase cage motor, are determined.

17. The soft starter of claim 7, wherein the at least one electronic circuit includes an ASIC.

18. The soft starter of claim 7, wherein the at least one electronic circuit includes at least one processor.

19. The soft starter of claim 7, wherein checking for existence of at least one of the grid-related firing criterion and the rotor-flux-related firing criterion is based upon a space vector representation of rotor flux, grid voltage and stator current.

20. The soft starter of claim 7, wherein the flux and torque angle region is displaced by an angle of rotation to compensate for a time delay between a firing decision and the firing.

\* \* \* \* \*